United States Patent
Okuno et al.

(10) Patent No.: US 8,782,239 B2
(45) Date of Patent: Jul. 15, 2014

(54) DISTRIBUTED ROUTER COMPUTING AT NETWORK NODES

(75) Inventors: Michitaka Okuno, Kokubunji (JP); Takeki Yazaki, Kawasaki (JP); Yuji Tsushima, Hachioji (JP); Hidetaka Aoki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 68 days.

(21) Appl. No.: 13/028,282

(22) Filed: Feb. 16, 2011

(65) Prior Publication Data

US 2011/0202658 A1    Aug. 18, 2011

(30) Foreign Application Priority Data

Feb. 18, 2010  (JP) .................................. 2010-033375

(51) Int. Cl.
*G06F 15/177* (2006.01)
*G06F 15/173* (2006.01)

(52) U.S. Cl.
USPC ........... 709/226; 709/221; 370/229; 370/252; 370/254

(58) Field of Classification Search
None
See application file for complete search history.

(56) References Cited

U.S. PATENT DOCUMENTS

| | | | |
|---|---|---|---|
| 6,108,703 A | | 8/2000 | Leighton et al. |
| 6,553,413 B1 | | 4/2003 | Leighton et al. |
| 8,145,732 B2 * | | 3/2012 | Kumar et al. ................. 709/220 |
| 2001/0021176 A1 * | | 9/2001 | Mimura et al. ............... 370/235 |
| 2002/0099850 A1 | | 7/2002 | Farber et al. |
| 2002/0141343 A1 * | | 10/2002 | Bays ............................. 370/235 |
| 2003/0033467 A1 * | | 2/2003 | Yoshizawa et al. ........... 710/305 |
| 2005/0213504 A1 * | | 9/2005 | Enomoto et al. .............. 370/235 |
| 2006/0155862 A1 | | 7/2006 | Kathi et al. |
| 2007/0047548 A1 * | | 3/2007 | Yazaki et al. ................. 370/392 |
| 2007/0118628 A1 * | | 5/2007 | Kumar et al. ................. 709/221 |
| 2008/0008202 A1 * | | 1/2008 | Terrell et al. ................. 370/401 |
| 2009/0097406 A1 * | | 4/2009 | Nilakantan et al. .......... 370/235 |

(Continued)

FOREIGN PATENT DOCUMENTS

| EP | 1887741 A1 * | 2/2008 |
|---|---|---|
| EP | 2362606 A1 * | 8/2011 |

(Continued)

OTHER PUBLICATIONS

Singh, Aameek, et al; 'Server-Storage Virtualization: Integration and Load Balancing in Data Centers,' IEEE, SC2008 Nov. 2008, Austin, TX, USA 978-1-4244-2835-9/08 [12 pages].

*Primary Examiner* — Hanh N Nguyen
*Assistant Examiner* — Joshua A Kading
(74) *Attorney, Agent, or Firm* — Antonelli, Terry, Stout & Kraus, LLP.

(57) ABSTRACT

A system permitting alteration of the information processing position, where an existing information system is used, while minimizing alterations in configuration or the like, is to be provided. Intelligent nodes each having an information processing section and any desired address altering section are arranged on boundaries of a network where packets are likely to pass. This node has a flow table for recognizing as a flow a group of packets transmitted from each user's terminal, a flow status table for determining the connection state and the next destination address or the final destination address of each flow, and a module to observe the loaded state of its own information processing function. It rewrites the destination address of any flow not in a connection-established state in the flow status table to a less loaded one out of its own information processing function section or external information processing apparatus.

21 Claims, 17 Drawing Sheets

(56) References Cited

U.S. PATENT DOCUMENTS

2009/0109985 A1* 4/2009 Yazaki et al. ............... 370/401
2010/0278069 A1* 11/2010 Sharma et al. ............... 370/254
2011/0103259 A1* 5/2011 Aybay et al. ............... 370/254
2011/0128969 A1* 6/2011 Scholl ............... 370/411

FOREIGN PATENT DOCUMENTS

| | | |
|---|---|---|
| JP | 2002-520735 | 7/2002 |
| JP | 2002-312312 | 10/2002 |
| WO | WO 2006/073804 | 7/2006 |

* cited by examiner

DISTRIBUTED ROUTER COMPUTING AT NETWORK NODES

CLAIM OF PRIORITY

The present application claims priority from Japanese patent application JP 2010-033375 filed on Feb. 18, 2010, the content of which is hereby incorporated by reference into this application.

FIELD OF THE INVENTION

The present information relates to an information system, and more particularly to fused technology of information processing and communication that permits solution of various issues of delay time, reliability and energy efficiency in data center-consolidated information systems.

BACKGROUND OF THE INVENTION

In response to the increasing size and complexity of information systems, the trend in favor of being "a user rather than an owner" is accelerated, and cloud computing utilizing data centers has emerged and is in spreading use.

When using such a data center, a delay time occurs as the use of a network is involved on the way. Especially if the data center is in a distant location, the long-distance transmission via a public network that will be involved is very likely also to entail deteriorations in reliability and/or energy efficiency in addition to the delay time. One of the conceivable solutions to this issue is offered by the new information and communication technology (ICT) platform by which the position of information processing is altered closer to the user, but as information systems are already integral parts of business corporations and other constituents of society, it is difficult to replace all at once the currently used information system with the new ICT platform.

On account of this issue, a new ICT platform having a mechanism that permits seamless shifting to it while ensuring compatibility with an existing information system such as a data center is required. Thus, the technology to be embodied in such a platform should permit the address at the time of transmission unaltered to be transmitted to the new information processing apparatus and information processing position while keeping the existing system as it is. Known cases of related art enabling the delay to be shortened by altering this information processing position include the following.

For instance, JP-A-2002-312312 (Patent document 1) discloses a configuration by the use of which, when a user expressly requests information processing apparatus, such as a local server, arranged in a user LAN, to process execution of an application, if no pertinent application is found in the local server, a packet is sent to information processing apparatus such as a data center positioned outside the network and processing; execution of the application is requested.

Further, JP-T-2002-520735 (Patent document 2) discloses a system for use, in a situation where a large number of sites are in a decentralized arrangement in different parts of the country, in causing a domain name system (DNS) to so assign destination addresses that a response with an address closer to the area of the source of the information processing request can be given to facilitate referencing of an appropriate site by the requesting source.

SUMMARY OF THE INVENTION

In the context of this specification, a network node, which is a node device, having an information process and an address altering process is referred to as an intelligent node (IN). The information processing here means the function of a usual computer (information processing apparatus) or the like to execute applications or process various kinds of data and the address altering process, a process to alter the destination of a packet to be transferred over a network or the destination of an output. In the terminology of this specification, the region within this intelligent node (IN) where its internal server processes information is referred to as the information processing section and data centers outside the intelligent node (IN) and servers and the like in any other intelligent node (IN) are referred to as information processing apparatus.

Further, another item of information processing apparatus which has a secton to consolidate information from sensors, filter information and communication instructions to actuators and other objects of control is referred to as an edge node.

When an information processing position is newly installed, the following two issues seem to require solution in order to achieve compatibility with existing information systems such as data centers.

First as Issue 1, as it is necessary to save the user's trouble of setting, even when a newly provided intelligent node or entrance node has been added, the flow of communication should allow alteration without requiring the user to alter his or her setting or, even when some alteration is needed, the quantity of alteration should be kept to the minimum.

Next as Issue 2, since a newly provided node by itself is smaller than a data center, when the load of information processing increases, it may be better to have the particular information processing done by another node or, in the worst case, by a data center. In such a case, the position of execution is dynamically altered in a relatively short period of time and, moreover, it should be possible to make the alteration exactly in a break of execution of the application so as not to invite an error in coordinating the execution of the application.

Whereas the first case of related art requires setting to enable the user to access the local server, this setting can be made common to all applications, and therefore Issue 1 may be irrelevant. However, as there is no mention in Patent document 1 to altering the position of execution and simple expansion cannot address the issue, Issue 2 cannot be solved.

The second case of related art cannot address the issue of access where the user directly designates the intended destination, but if a uniform resource locator (URL) designates it, the user need not make any setting and accordingly Issue 1 can be solved. However, if the load of sites having guided the user increases to deteriorate the response, it will take a substantially long time to set a new designation in the DNS and to have it reflected on the user's part, making it impossible to solve Issue 2.

An object of the present invention is to provide a fused information processing/communication system, node apparatus, and method that can, when a new information processing position has been added to an environment in which an existing information system is used, minimize needed alterations in setting and configuration on the part of the user and the data center and correctly recognize breaks in the execution of any application and dynamically alter the position of the execution.

In order to achieve the object stated above, according to one aspect of the invention there is provided an information system having a configuration in which information processing apparatus and terminals requesting the information processing apparatus for processing are arranged on a network, the system including a plurality of network nodes that are arranged in boundary positions (edge router positions) or gateway positions of the network and a management node that manages a plurality of the network nodes, wherein the network node has an information processing section for executing any given application and, for the purpose of transferring received packets to any destination addresses that the network node decides, identifies a group of the packets having the same header information as a flow in accordance with rules set forth with regard to the packets, and is further provided with a network unit that alters the connection state of each of the flows to the information processing section or to the information processing apparatus and destination addresses or destinations of the flow matching a table for recording the destinations in accordance with the destination, wherein the management node generates a request for copying an application to be executed by the information processing apparatus and a request for rewriting the table to the information processing section of the network node and transmit the request to the network node; and the network node copies the application in the information processing section on the basis of the request from the management node and rewrites, on the basis of the rewriting request, the destination of the packet belonging to the flow designated in the table.

Also to achieve the object stated above, according to another aspect of the invention, there is provided a node apparatus to be connected to information processing apparatus via a network, including an information processing section for executing any given application, and a network unit for transferring received packets to any destination addresses that the network node decides, wherein the network unit has an destination decision block that alters a table for recording the connection state and the destination of each flow including a plurality of the packets relative to the information processing section or the information processing apparatus, the destination address or the destination of the flow matching the table on the basis of the destination of the table; and the destination decision block rewrites the destination of the table of the flow the connection state of which is a not-connected state.

Further to achieve the object stated above, according to still another aspect of the invention there is provided a method of altering destination addresses in the network node of an information system in which network nodes having information processing sections and information processing apparatus are arranged on a network, whereby the network node alters, by using the information processing section or a table for recording the connection state and the destination relative to the information processing apparatus of each flow including a plurality of the packets, the destination address or the destination of the flow of a plurality of received packets matching the table on the basis of the destination of the table; and further rewrites the destination of the table on the basis of the information of the packet.

Also in an exemplary mode of implementing the invention, intelligent nodes (IN), which are node apparatuses each provided with an information processing section and an address altering section are arranged on the boundaries (edge router positions) of the network where packets would pass. Each of these intelligent nodes (IN) has tables including a flow table for identifying the group of packets transmitted from each user terminal as a flow and a flow status table that determines the connection state (connection state of packet communication) and the next destination address or the final destination address of each flow, and observes the loaded state of its own information processing section. It rewrites the destination address of any flow not in a connection-established state in the flow status table to that of a less loaded one out of its own information processing section or external information processing apparatus.

This rewriting of "the destination address of any flow not in a connection-established state" enables the position of execution to be altered at a break of the execution of the application. This operation requires no alteration of setting by the user.

The present invention can be more preferably applied to a network configuration in which intelligent nodes (IN) are arranged in edge router positions or default gateway positions or in which the next destination address of a packet in a specific direction of communication apparatus around the intelligent node (IN) is selected as the pertinent intelligent node (IN).

According to the invention, a data center-consolidated information system that can solve issues of delay time, reliability and energy efficiency therein can be provided.

The invention also enables a system that can, even when a newly provided intelligent node or entrance node has been added, the flow of communication allows alteration without requiring the user to alter his or her setting or, even when some alteration is needed, the quantity of alteration should be kept to the minimum with the address at the time of transmission kept unaltered from what it is in the existing system.

DETAILED DESCRIPTION OF THE PREFERRED EMBODIMENT

An information processing and fused technology system and an intelligent node (IN), which constitute one preferred embodiment of the present invention, will be described below with reference to the accompanying drawings.

First Embodiment

First, the basic configuration of the intelligent node (IN) as an information processing and fused technology system, which is the first embodiment of the invention, and the position in which it is arranged on a network will be described with reference to FIG. 1 and FIG. 13 through FIG. 15. The intelligent node (IN) of this embodiment executes information processing by a server (server's process) and an address altering process module. As will be described in detail afterwards, by using this address altering process module, application processing which conventionally is done at a distant data center (DC) or the like is enabled to be executed in a network node near the terminal by replacing the destination address or the destination, for instance, with its own node, resulting in an effect to reduce the delay in processing as seen from the terminal side. Furthermore, as a secondary effect, the quantity of data flowing in the network can be restrained, with an overall effect of electric power saving for the whole system.

Figure 1:
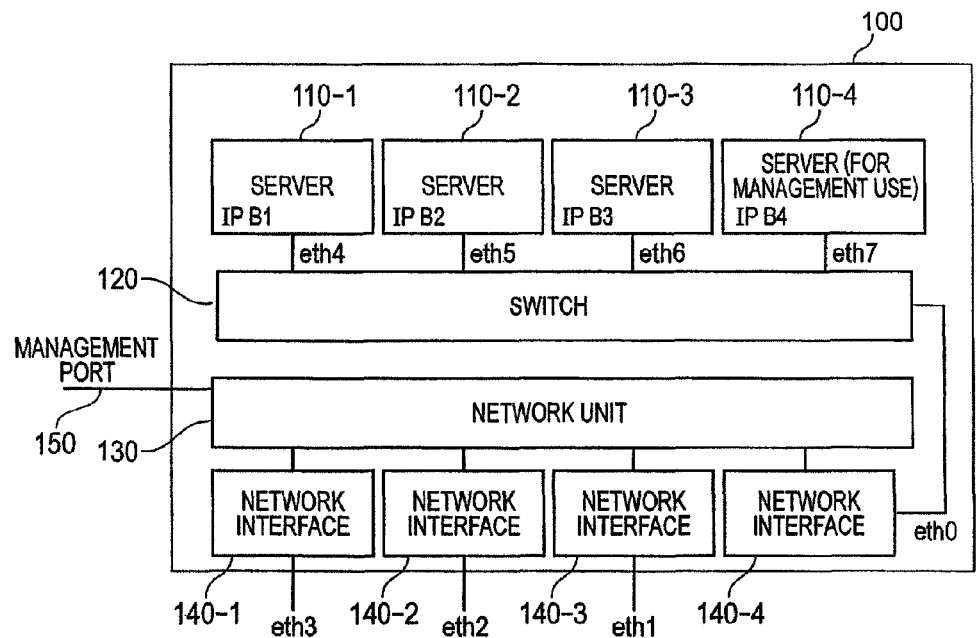
FIG. 1 shows the hardware configuration of an intelligent node, which is a first embodiment of the invention.

FIG. 1 shows one example of configuration of the intelligent node (IN), which is the first embodiment of the invention. This intelligent node 100 has a server processing section to be performed by at least one server and an address altering processing section to be performed by a network unit.

Referring to FIG. 1, the intelligent node 100 comprises multiple servers 110-1 through 110-4, a switch 120, the network unit 130, multiple network interfaces 140-1 through 140-4, and a management port 150. The server, having a usual computer configuration, is obviously provided with a central processing unit (CPU), which is a processing section, and a memory and a storage as storage units for storing data as well as various programs to be executed by the CPU. The internal configuration of a specific server will be touched on when the description will refer to FIG. 12.

Media Access Control (MAC) addresses eth3, eth2, eth1, and eth0 are assigned to network interfaces 140-1 through 140-4 of the intelligent node 100 shown in FIG. 1, while IP addresses IP B1 through IP B4 and MAC addresses eth4 through eth7 are assigned to servers 110-1 through 110-4, respectively. Connection between the switch 120 and multiple servers 110-1 through 110-4 or the multiple network interfaces 140-1 through 140-4 is established by using Ethernet®. The Ethernet for this purpose may be, for instance, a 10 gigabit Ethernet.

Whereas various configurations are conceivable for the network in which the intelligent node (IN) of this embodiment is to be arranged, typical examples will be described with reference to FIG. 13 through FIG. 15.

Figure 13:
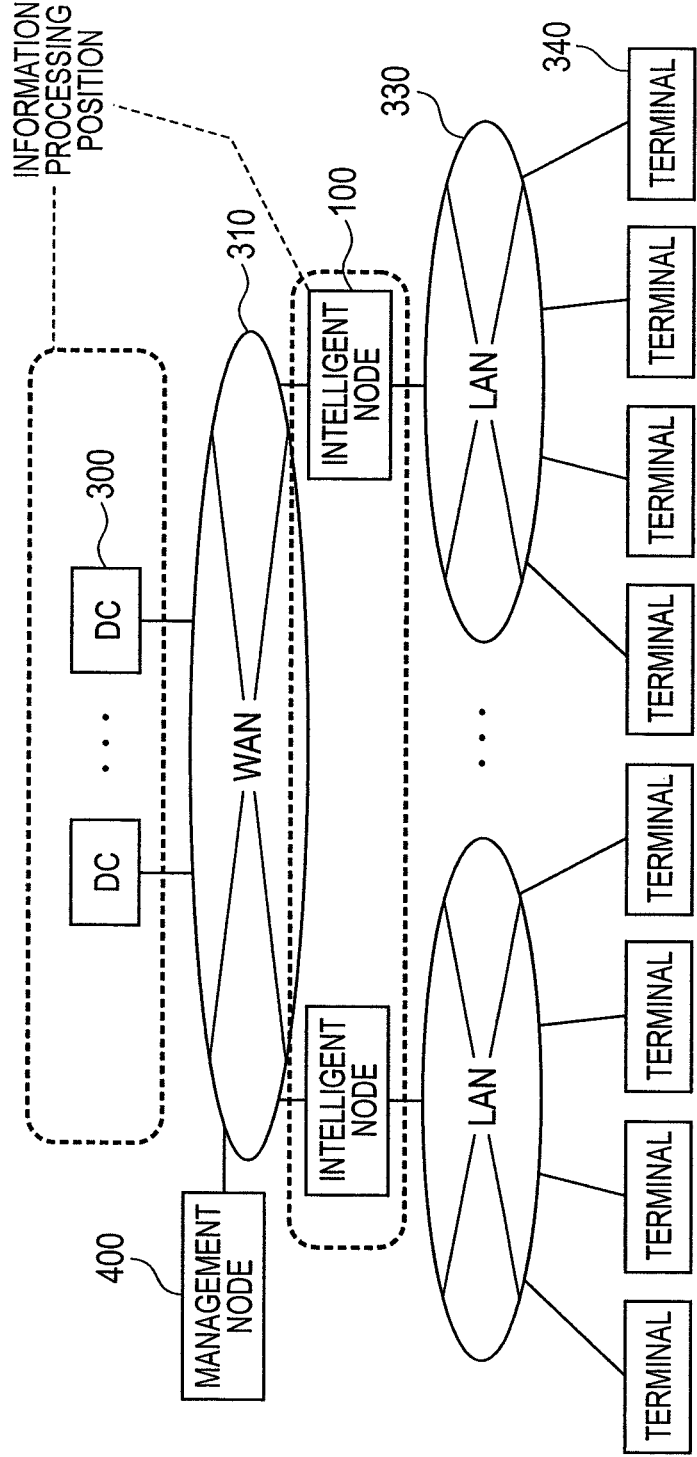
FIG. 13 shows one configuration of a network in the first embodiment.

FIG. 13 shows one preferable example of network configuration, wherein multiple units of the intelligent node 100 shown in FIG. 1 are arranged between a wide area network (WAN) 310 and a local area network (LAN) 330. Terminals 340 including the user's personal computer (PC) are connected to the LAN 330. On the other hand, a data center (DC) 300 provided with at least one intelligent node 100 and at least one unit of information processing apparatus and a management node 400 are connected to the WAN 310.

The management node 400, as will be described afterwards, collects performance information and positional information on the intelligent node 100 and the data center (DC) 300 capable of executing applications, and carries out arrangement of applications, setting of the intelligent node (IN), and setting of network devices between networks. The performance information includes the type, operating frequency, number of units, memory capacity, disk capacity, OS type, and dedicated hardware type of the CPU or CPUs the apparatus has. The positional information comprises connective relationship of the intelligent node or the data center (DC) 300 with terminals requesting information processing or sensors on the network and communication delay information.

In this configuration the possible positions of information processing are the multiple intelligent nodes 100 and the multiple data centers (DC) 300. Thus, the information processing positions are not only the data center (DC) 300 but also the intelligent node 100 near the user. This system configuration is known as the cloud two-tier model. The internal configuration of the data center (DC) 300 will be described afterwards.

Figure 14:
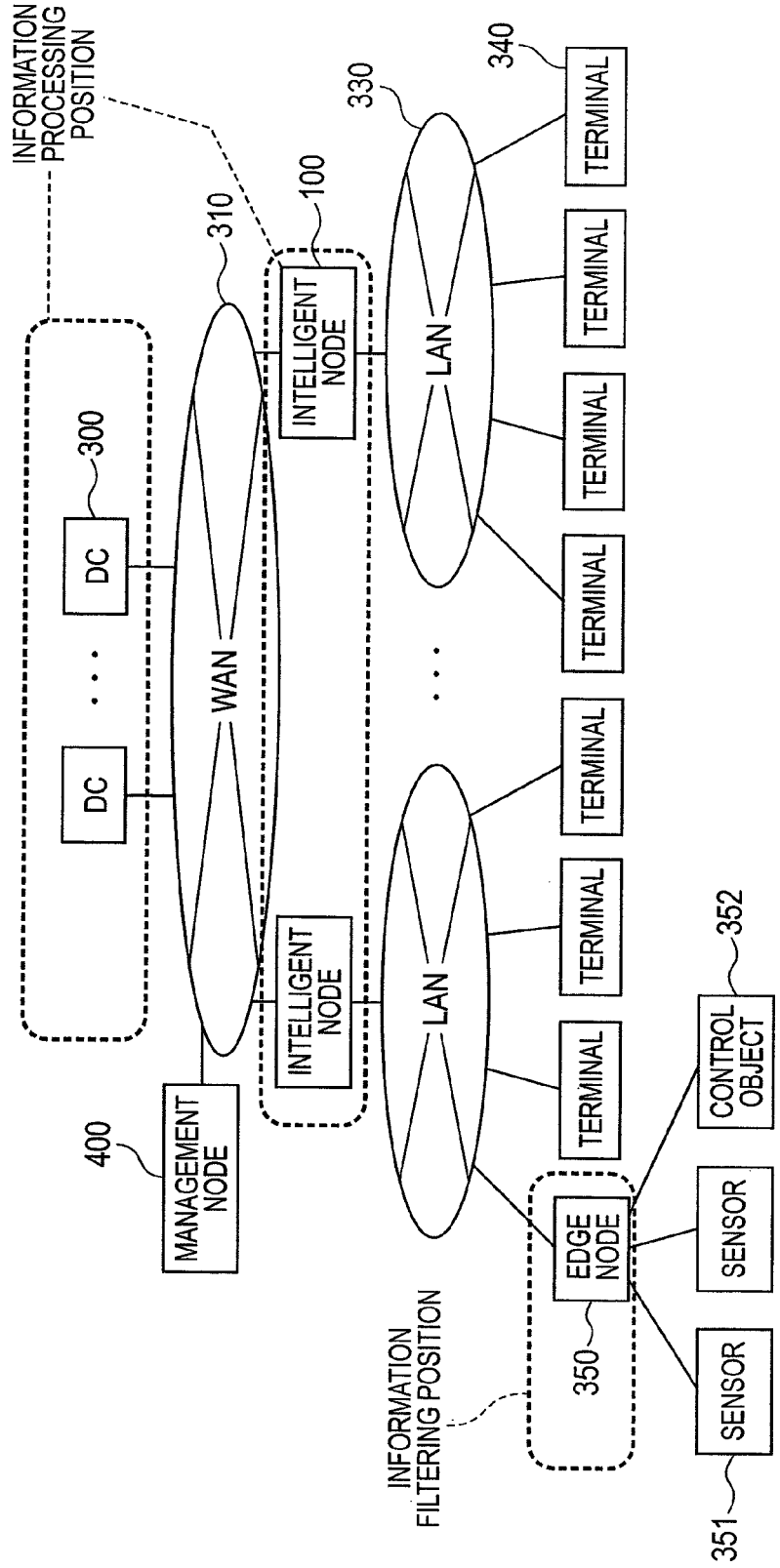
FIG. 14 shows another configuration of a network in the first embodiment.

FIG. 14 shows another example of network configuration. The difference from the network configuration of FIG. 13 consists in the connection of an edge node (EN) 350 to the LAN 330 in addition to the multiple terminals 340. To this edge node (EN) 350, various sensors 351 and a control object 352 are connected. The edge node (EN) 350 is arranged between a LAN 330 on the one hand and the sensors 351 and the control object 352, which may be an actuator or the like. Thus, the edge node (EN) 350 has a module to integrate information from the sensors 351, a module to filter the information, and a module to communicate instructions to the control object 352, which may be an actuator or the like, and other destinations.

This configuration is intended to prevent, when large numbers of sensors 351 and control objects 352, in addition to the terminals 340, typically PCs and mobile terminals, are to be connected to the network, coming from a large quantity of sensor information from keeping on flowing into the network and pressuring the network band. The edge node (EN) 350 filters sensor information in accordance with predetermined rules. In this configuration, the edge node (EN) 350 also is one of the control objects of the management node 400. A user terminal, such as a PC, may as well be connected to this edge node (EN) 350. In this system configuration, too, the positions of information processing are the multiple data centers (DC) 300 and the multiple intelligent nodes 100. The system configuration shown in FIG. 14 is known as the cloud three-tier model.

Figure 15:
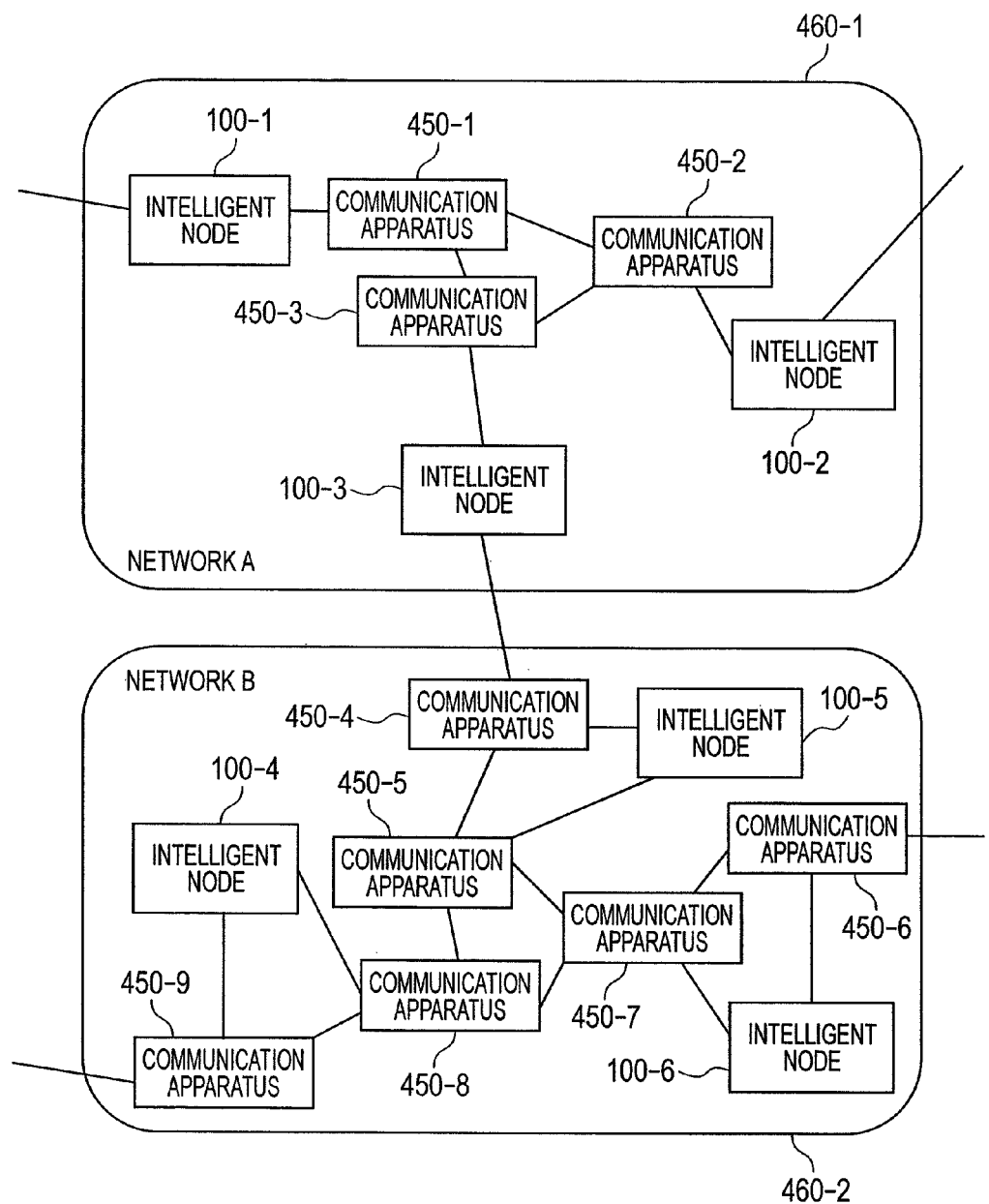
FIG. 15 shows one configuration of a case in which intelligent nodes are arranged in a WAN in the first embodiment.

FIG. 15 shows a network configuration in which intelligent nodes 100 are arranged within the WAN 310 of FIG. 13 or FIG. 14 as a third example of network configuration. The figure illustrates a method according to which intelligent nodes 100 are arranged in a network A460-1 as the WAN at terminal ends of the network (positions where a gateway or an edge router is placed) managed by an Internet services provider (ISP) or the like. Reference numerals 450-1 through 450-3 denote communication apparatuses.

In this case, as every packet that flows into the network A460-1 passes an intelligent node 100, the intelligent node 100 can, by an address altering section to be described afterwards, capture the flowing-in packet into its own server to subject it to information processing or transfer the packet as it is to a data center (DC).

Regarding a network B460-2, on the other hand, a method according to which intelligent nodes 100 are arranged at terminal ends of the network in positions adjoining communication apparatuses 450-4, 450-6, and 450-9. In this case, by so setting in advance that the communication apparatuses 450-4, 450-6, and 450-9 adjoining the intelligent nodes 100 transfer packets flowing into the network B460-2 to the intelligent nodes 100, processing of the packets, which constitute the information flowing into the network B460-2, in the intelligent nodes 100 is made possible. Reference numerals 450-5, 450-7, and 450-8 also denote communication apparatuses.

In the network configurations shown in FIG. 13 through FIG. 15, the intelligent nodes (IN) 100 copy applications arranged in accordance with an instruction from the management node 400 to be described afterwards, and execute them with a server processing module within them.

Also, the intelligent node (IN), as will be described in detail afterwards, has a module to alter, by utilizing its address altering process, the destination of a packet meeting specific conditions, namely only the combination of a source Internet Protocol (IP) address (SIP), a destination IP address (DIP), a source port (SP), and a destination port (DP), or this combination plus a session identifier (ID), to one of the servers 110 under the management by this node or to an external intelligent node (IN) or data center (DC). In this processing, as will be described in detail afterwards, the address altering module or the server processing module in the intelligent node (IN) also has a module to use the IP address of the data center (DC) 300 as the node's own IP address.

Operation based on this address altering module enables packets destined for the data center (DC) 300 to be captured into the intelligent node (IN). If the load on the server processing module of this node is found heavy, the address altering module will be notified of this heavy load and packets of new low-priority users will be transferred to outside. It is also made possible to transmit some of the packets to applications in the part of the data center (DC) interlocked with applications of this node. Further, the data center (DC) accumulates and processes data transferred from the intelligent node (IN), and notifies the intelligent node (IN) of new parameters and actions.

Figure 12:
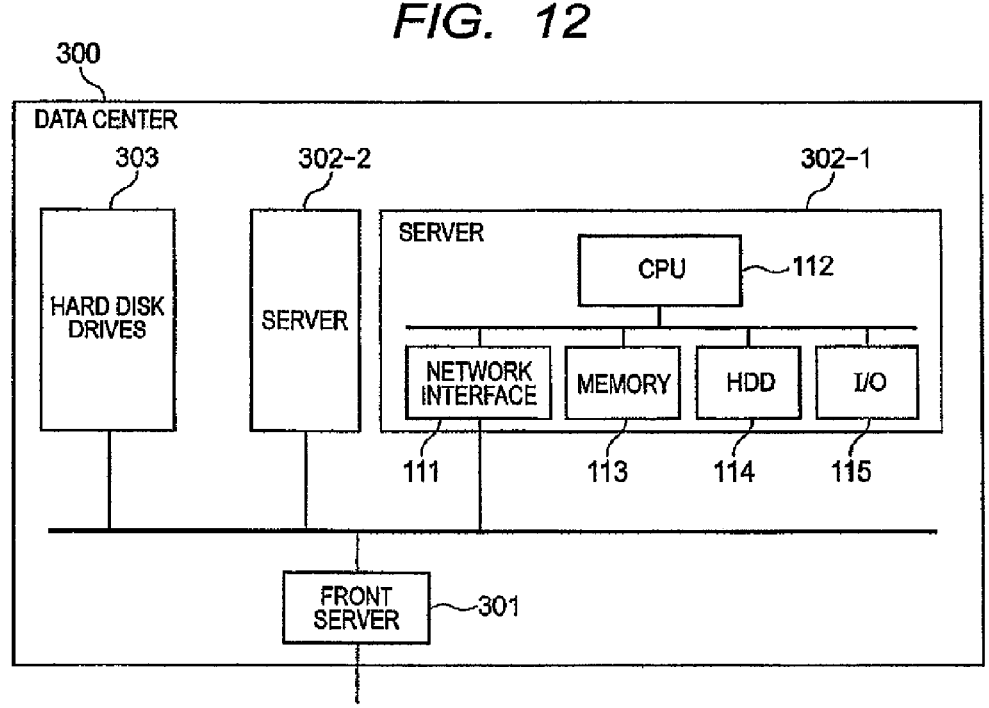
FIG. 12 is a block diagram showing one configuration of a data center.

FIG. 12 shows one typical configuration of the data center (DC) 300 illustrated in FIG. 13 and FIG. 14. As shown in FIG. 12, the data center (DC) 300 comprises a front server 301 arranged at the entrance, multiple servers 302-1, 302-2 . . . connected inside to the network, and a hard disk drives 303. As exemplified by the server 302-1, each server is a usual computer, to which a network interface 111, a memory 113, and a hard disk drive (HDD) together constituting a storage unit, input/output units (I/O) such as a mouse and a display, and a CPU 112, which is a processing unit, are connected by an internal bus.

The multiple servers 302-1, 302-2 . . . execute various applications on the CPU 112. Herein, the front server 301 installed at the entrance is connected to a WAN and functions as a load balancer for the data center 300. As earlier stated, the functions of information processing by the servers of this data center (DC) are collectively referred to as information processing apparatus in this specification. Further, the internal configurations of the servers 110-1 through 110-4 earlier described with reference to FIG. 1 are similar to those of the servers described here.

Next, the modules and roles of the management node 400 illustrated in FIG. 13 and FIG. 14 will be described. Out of the modules of the management node 400, those of managing the setting of various tables will be described as part of the description of the network unit 130 with reference to FIG. 2 through FIG. 11.

Figure 11:
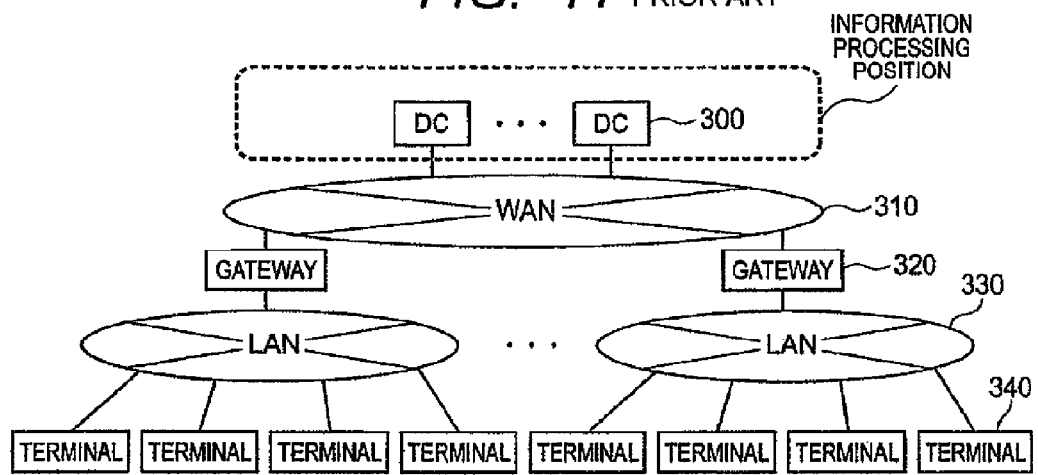
FIG. 11 shows a known network configuration.

In order to return as soon as practicable to the user the result of the application processing requested by the user, control should so effected as to minimize the sum of the communication delay in the network and the delay in processing by the servers. For this purpose, as shown in FIG. 13 and FIG. 14, the intelligent node 100 is arranged in the position where a conventional gateway device (a gateway 320 in FIG. 11) is arranged on a network near the user, and the management node 400 for managing multiple intelligent nodes is arranged on the network. To add, though detailed description is omitted, FIG. 11 shows one example of conventional network configuration for the purpose of comparison. In the network configuration of FIG. 11, the position of information processing is limited to only the data center (DC) 300.

The role of the management node 400 in this embodiment includes effecting of controls to arrange in intelligent nodes (IN) some of the data corresponding to services such as various applications being executed at the data center (DC) 300, especially to those being executed by application servers within the data center (DC) 300.

Setting in the intelligent nodes (IN) in various ways is also accomplished by the management node 400. Multiple intelligent nodes (IN) are present in the network as stated above, each notifying information on the packet flow passing it, information on its various devices, such as the number of servers having the information processing units, the performance information on their CPUs, the applications they are currently equipped with, the state of communication load, that of information processing load, and information on power consumption. Taking account of these items of information, the management node 400, as described above, selects out of the applications operating in the data center (DC) 300 ones which preferably should be arranged in intelligent nodes (IN) and, if they are kinds of application whose copy can be executed in the intelligent nodes (IN), transfers to each designated intelligent node (IN) the pertinent application and the minimum data required for its execution.

Each intelligent node (IN) receives this transfer and, in accordance with a policy allocated by the management node 400, copies into one or more of its information processing units the pertinent application or applications and the relevant data. Then the intelligent node (IN), informed of the permission to alter the destination from the management node, rewrites the destination address or the destination of the pertinent flow currently not connected while observing information in its own flow status table, which will be described in detail afterwards and thereafter, upon receiving new communication from the pertinent flow, can alter the destination address or the destination of that flow.

Further, the management node 400 monitors the arrangement relations of all the intelligent nodes 100 and all the edge nodes (EN) 350 involving communications between the data center (DC) 300 and the terminals 340 or the like on the network, information processing resources on the intelligent nodes 100 and the particulars of information processing at the data center (DC) 300. This monitoring can be realized by keeping monitoring programs in operation in the intelligent nodes 100, the edge nodes (EN) 350, and the data center (DC) 300 and carrying out packet-by-packet information exchanging between the management node 400 and each monitoring program.

Incidentally, as the number of objects of control by the management node 400 may become enormous, it can as well be configured as a hierarchical management node. For instance, one (110-4) of the servers in an intelligent node 100 is allocated as the sub-sub-management node for managing multiple edge nodes (EN), and a sub-management node for managing multiple intelligent nodes (IN) and a parent management node for managing the whole tree by managing multiple sub-management nodes are arranged on the WAN 310 to accomplish management while exchanging information between each other.

Even in this hierarchical structure, the management node 400 has a role to deliver, on the basis of monitored information and on behalf of the data center (DC) 300, an application to enable the intelligent node 100 to process information. More specifically, the management node 400 distributes applications to the management server 110-4 allocated as the sub-sub-management node in the intelligent node 100, and a management program in the management server 110-4 applies the application to one of the servers 110 in the intelligent node 100 in accordance with a prescribed policy.

One of the conceivable policies for this purpose is a method by which applications are allocated to one or more of the servers lower in utilization rate among those satisfying the CPU capability and the memory capacity the pertinent application requires. Another is a method by which a level of priority is determined for each application and a high priority application is assigned to one or more servers while a low priority application is assigned to one or more of other servers. Incidentally, at the time a given application is delivered, it is in an idle state and is actuated when a group of packets including data for execution of the application has actually arrived from a terminal.

The basic configuration of the intelligent node (IN) as apparatus for information processing and fused technology of information processing and communication in this embodiment of the invention and their positioning on a network among other aspects have been described so far. Now, various processes and actions of the intelligent node 100 will be described with reference to FIG. 2 through FIG. 6.

Figure 2:
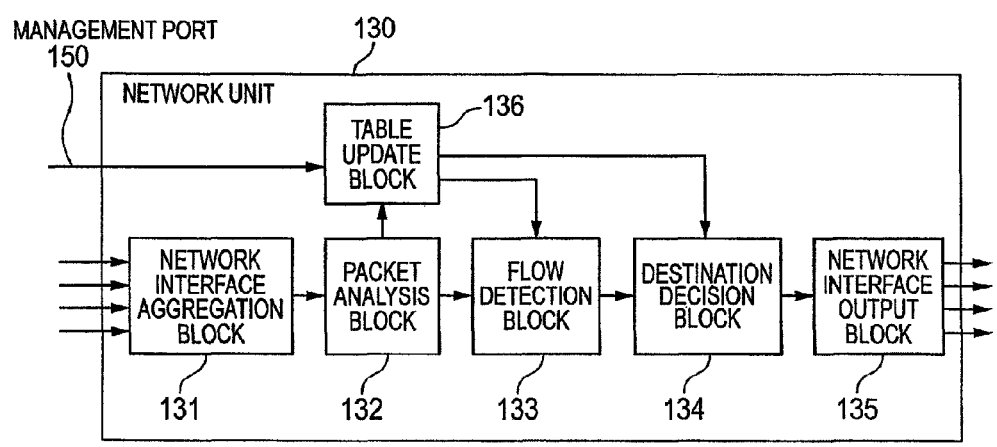
FIG. 2 is a block diagram showing one configuration of the network unit in the first embodiment.

FIG. 2 is a block diagram showing one configuration of the network unit 130 in the intelligent node 100 of FIG. 1. As is evident from FIG. 1, the network unit 130 comprises modules including a network interface aggregation block 131, a packet analysis block 132, a flow detection block 133 provided with a flow table, an destination decision block 134 provided with a flow status table, a network interface output block 135, and a table update block 136. These modules may as well be configured of hardware as of software. When they are configured of software, the network unit can be realized by using a CPU and a memory and having the CPU execute programs on the memory.

First, the network interface aggregation block 131 consolidates packets flowing in from the multiple network interfaces 140-1 through 140-4 of FIG. 1. The packets consolidated here are delivered to the packet analysis block 132 to be analyzed.

Figure 6:
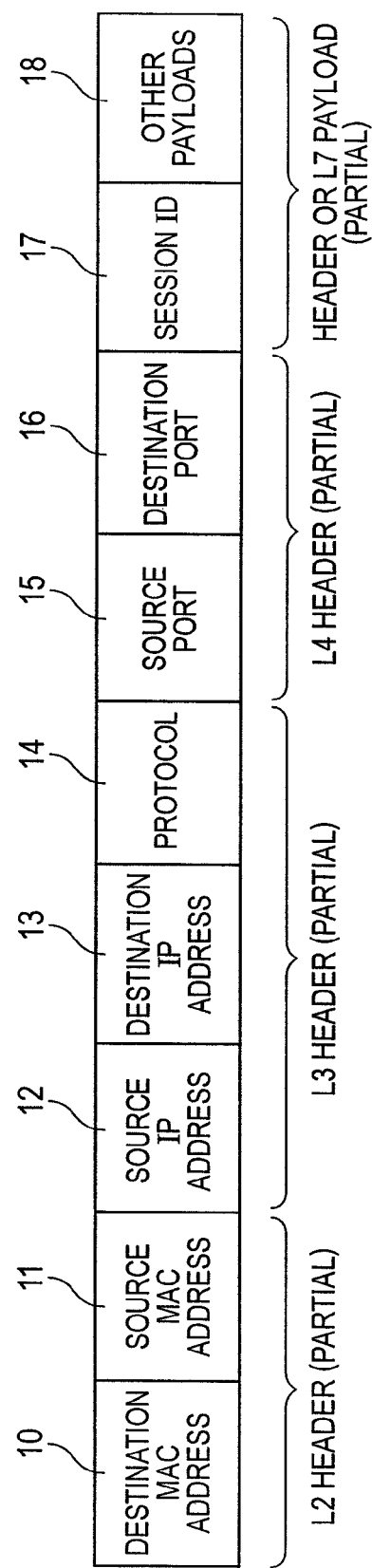
FIG. 6 shows one example of a packet format in the first embodiment.

FIG. 6 shows one example of packet format of the packets used in this embodiment. The illustration of the format in FIG. 6 covers only the parts relevant to the system and apparatus of this embodiment, and others are omitted. As shown in FIG. 6, in a layer 2 (2) header (partially extracted), which is a data link layer, a destination MAC address 10, and a source MAC address 11 are arranged. The L2 header sets, when a packet is to be transferred from a unit A to a unit B, sets the source MAC address 11 to the MAC address of the network interface connected to the unit A connected to the unit B (e. g. eth1 in FIG. 1) and the destination MAC address 10 to the MAC address of the network interface of the unit B connected to the unit A.

In the system of this embodiment, the MAC address of the L2 header to be assigned to a packet is altered by rewriting the interface in the flow status table, to be described in detail afterwards, with the table update block 136 of the network unit 130 in the intelligent node 100. For instance, when the destination address of a packet is to be forcibly altered to the own server 110-1 of the intelligent node 100, the packet is enabled to be transmitted to the server 110-1 by rewriting the source MAC address 11 to eth0 in FIG. 1 and the destination address MAC address 10 to eth4, which is the MAC address of the server 110-1.

In this process, though the destination address MAC address of the packet is the server 110-1, the destination IP address remains as it is. Thus, the node's own server 110 receives a packet not destined for its own IP address. Since the server 110 usually cannot receive this packet, it is so set in advance, namely at a timing prior to setting to its own address, in a flow status table 210 as to enable the destination IP address of the flow to be received. When a packet is to be returned to the flow, the source IP address should be the destination IP address of the flow instead of the node's genuine own IP address. On the terminal 340 side, the application can be executed without suffering mismatching on the information processing unit including the multiple servers of the intelligent node 100 of this embodiment as a reality though the packet is transmitted to the genuine destination IP address.

Further in the packet format of FIG. 6, a source Internet Protocol (IP) address (SIP) 12, a destination IP address (DIP) 13, and a protocol 14 are arranged in a layer 3 (L3) header (partially extracted), which is a network layer. This L3 header is used for routing the packet from the source IP address 12 to the destination IP address 13 in IP communication. Further, the protocol type of L4 is distinguished by the protocol 14. In this embodiment, these are used as conditions for detecting a flow.

Further, a source port (SP) 15 and a destination port (DP) 16 are arranged in a layer 4 (L4) header, which is a transport layer. Whereas the L4 header is used for indicating the application to be communicated, these are also used as conditions for detecting a flow.

Finally in a layer 7 (L7) header, which is an application layer, or an L7 payload (partially extracted), a session identifier (ID) 17 and other payloads are arranged.

This session ID 17 is an identifier for recognizing access by a specific user or an information transmitting source. For instance, whereas a protocol known as Hyper Text Transfer Protocol (http) is used between a web browser and a web server in web data exchanges, http does not have a function to hold a state and, even if a user accesses (causes a web page to be displayed) multiple times consecutively, the server side cannot recognize them as accesses by a specific user, and instead deems them to be accesses by multiple users. This is inconvenient when a user logs into a certain site for shopping, but the specific user has to be recognized. The session ID 17 can be used for identifying a specific user in such a case.

In a usual mechanism of identifying the user, the server automatically allocates an identification code to the user upon his or her first access and identifies the user by using that ID code. This ID code is the session ID mentioned above. The user (browser) has to transmit the session ID every time he or she accesses that website. The session ID is usually stored by the browser as a cookie, and is automatically transmitted by the browser at the time of accessing a website. If a user becomes identifiable by a session ID, the server can make ready a place wherein the information can be preserved with that session ID as its key. Although this description cites a cookie for use in web data exchanges, information identifying the user or the source of information transmission can be defined as the session ID 17, and that role is used in this embodiment as well.

This session ID 17 may be used in one or the other of two different cases: the L7 header of each packet may be contained in one L7 payload or may extend over the L7 payloads of multiple packets. In the former case, the session ID can be identified by checking the contents of each packet. In the latter case, the session ID can be identified by once removing the headers of the packet until L7, combining the L7 payloads in the correct order, restoring them as the data of the application and checking those data.

Returning to the description of the network unit 130 of the intelligent node (IN) illustrated in FIG. 2, when the packet analysis block 132 analyzes each of the packets that successively flow and transmits necessary information to the table update block 136, the table update block 136 updates on the basis of the received information the contents of tables stored in the storage unit. Thus, the, table update block 136 updates the flow table and the flow status table.

Referring back to FIG. 1 hereupon, the notifying process of the servers 110-1 through 110-4 within the intelligent node 100 will be described. The CPU, which is the processing unit of the servers 110, regularly transfers to the network unit 130 control packets packed with the servers' own load information. The time intervals of transfer, determined as instructed by the management node 400 referred to above, may be 10 ms, 50 ms or 1 s for instance. Obviously, the program for monitoring load information and notifying at regular intervals a designated destination address of this information as a packet is kept in operation on each of the servers 110.

The load information each of the servers 110-1 through 110-4 notifies with its load information notifying process includes the averages of, for instance, the utilization rates of the CPU (the average of the lengths of time until regular notifications) and those of the memory (or the quantity of use of the memory relative to the capacity of the mounted memory). If either or both of the CPU utilization rate and the utilization rate of the memory, which is a storage unit, surpass their predetermined thresholds, the load can be determined to be heavy. The relative heaviness of the load may be determined as well by the source intelligent node (IN) as by the receiving intelligent node (IN). Whichever the case may be, eventually the table update block 136 of the receiving intelligent node (IN) uses the load information as the result of determination in updating each table.

When a packet is received by the network unit 130 of the intelligent node (IN), whether it is the own control packet of the pertinent intelligent node (IN) or a packet having any other destination address is judged by having the packet analysis block 132 checking the destination address MAC address and the destination IP address of the packet. If it is a control packet addressed to the intelligent node (IN) and contains load information, the applicable load information is transferred to the table update block 136 for use in the next updating of the flow status table 210. For instance, the table update block 136 checks, at every time of updating, the load information that has arrived. If the load on the CPU on the pertinent server is set to 80% and the threshold to 70%, the load to be processed can be judged to have surpassed the threshold.

The form of the packet to notify load information is such that the load information is stated in the L7 payload 18 part of the packet format of FIG. 6. The source IP address 12 shall be the server's own IP address and the destination IP address 13, the designated intelligent node.

Figure 3:
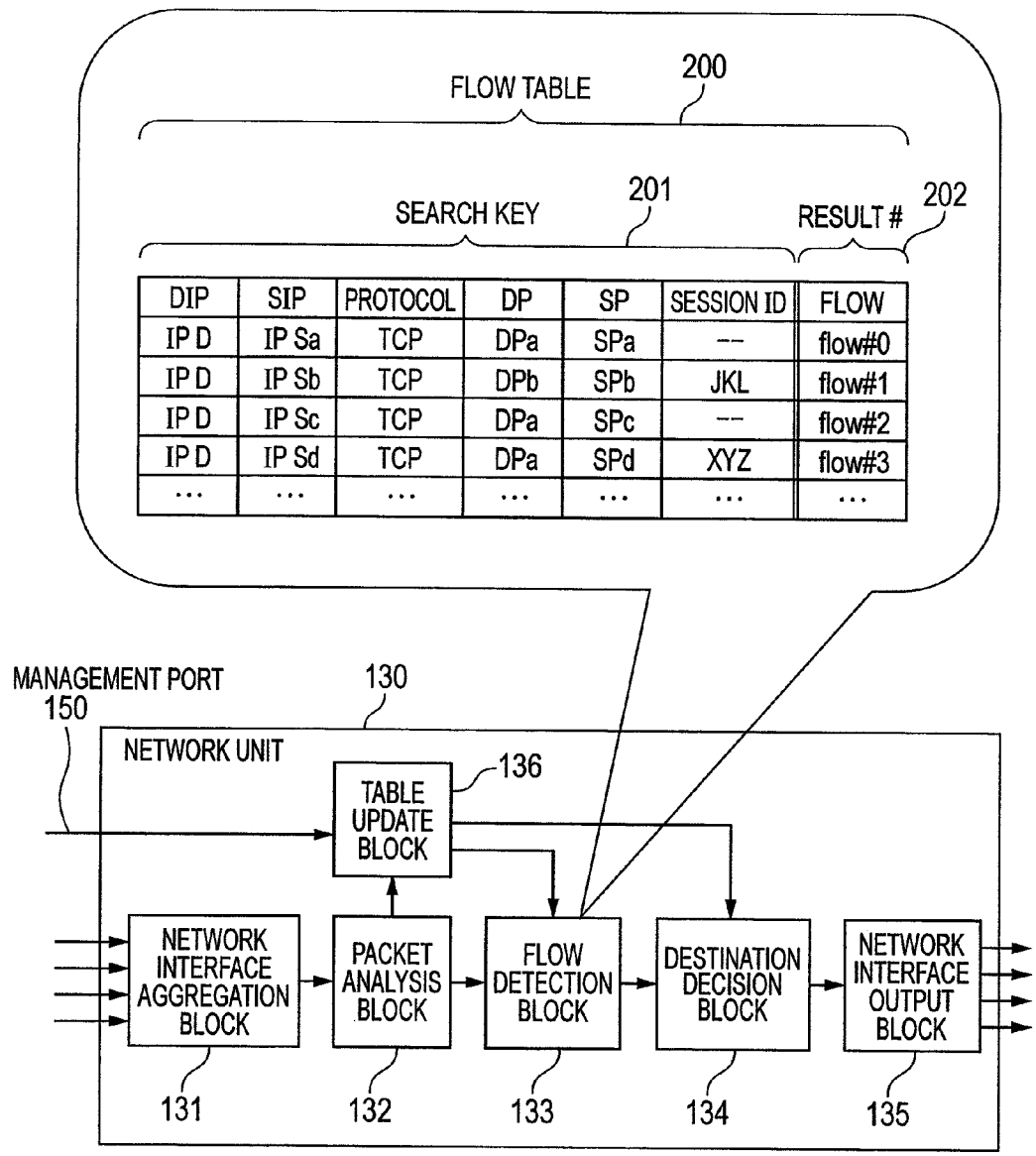
FIG. 3 shows one example of a flow detection block and a flow table in the first embodiment.

As shown in FIG. 3, the flow detection block 133 uses a flow table 200 to detect a flow and identifies the flow number. As is evident from the flow table 200 of FIG. 3, search keys 201 used for flow detection obviously match information on various layers obtained by analyzing the packet. The pertinent flow detection results (results #) 202 are outputted to the destination decision block 134.

Figure 4:
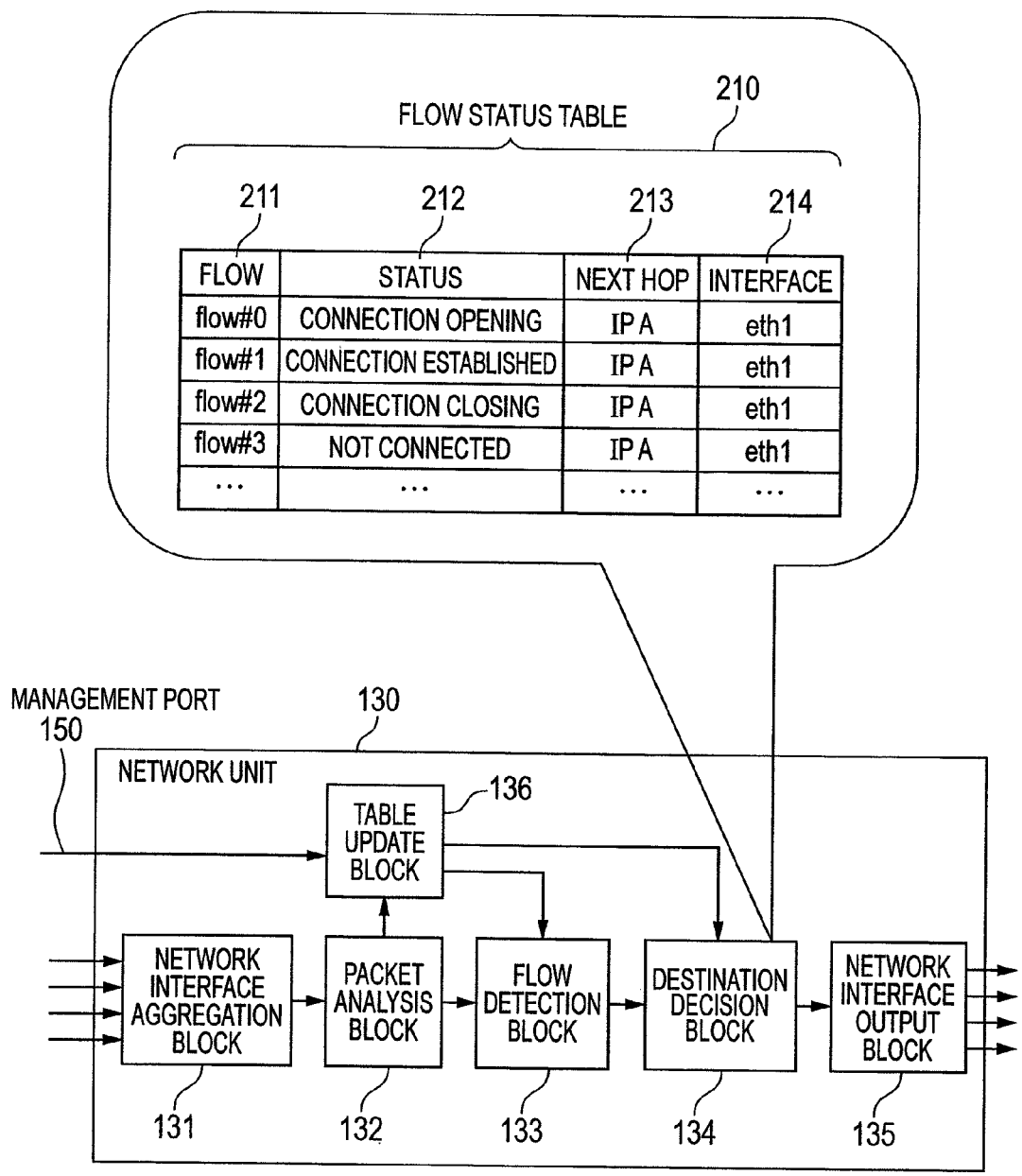
FIG. 4 shows one example of a destination decision block and a flow status table in the first embodiment.

As shown in FIG. 4, the destination decision block 134 determines by using the flow status table 210 the network to which the pertinent packet is to be outputted on the basis of the result of detection by the flow detection block 133, and outputs it to the network interface output block 135. As is obvious from FIG. 4, the flow status table 210 stores and updates statuses 212, next hops 213, and interfaces 214 corresponding to flow numbers 211.

In this flow status table 210, the next hop 213 means "the IP address of (L3 logic information on) the device required to be relayed next" and the interface 214, "the interface name (corresponding to the source MAC address) of (L2 physical information on) the pertinent device connected to the next hop 213". The destination address MAC address is obtained by subjecting the IP address of the next hop 213 to Address Resolution Protocol (ARP) processing, and the result is recorded in an information list commonly known as an ARP table. With respect to this embodiment, description of this ARP table is omitted.

As is understood from the flow status table 210 of FIG. 4, "Connection opening", "Connection established", "Connection closing", and "Not connected" respectively correspond to flow #0 through flow #3 among the flows 211 as the statuses 212.

Figure 5:
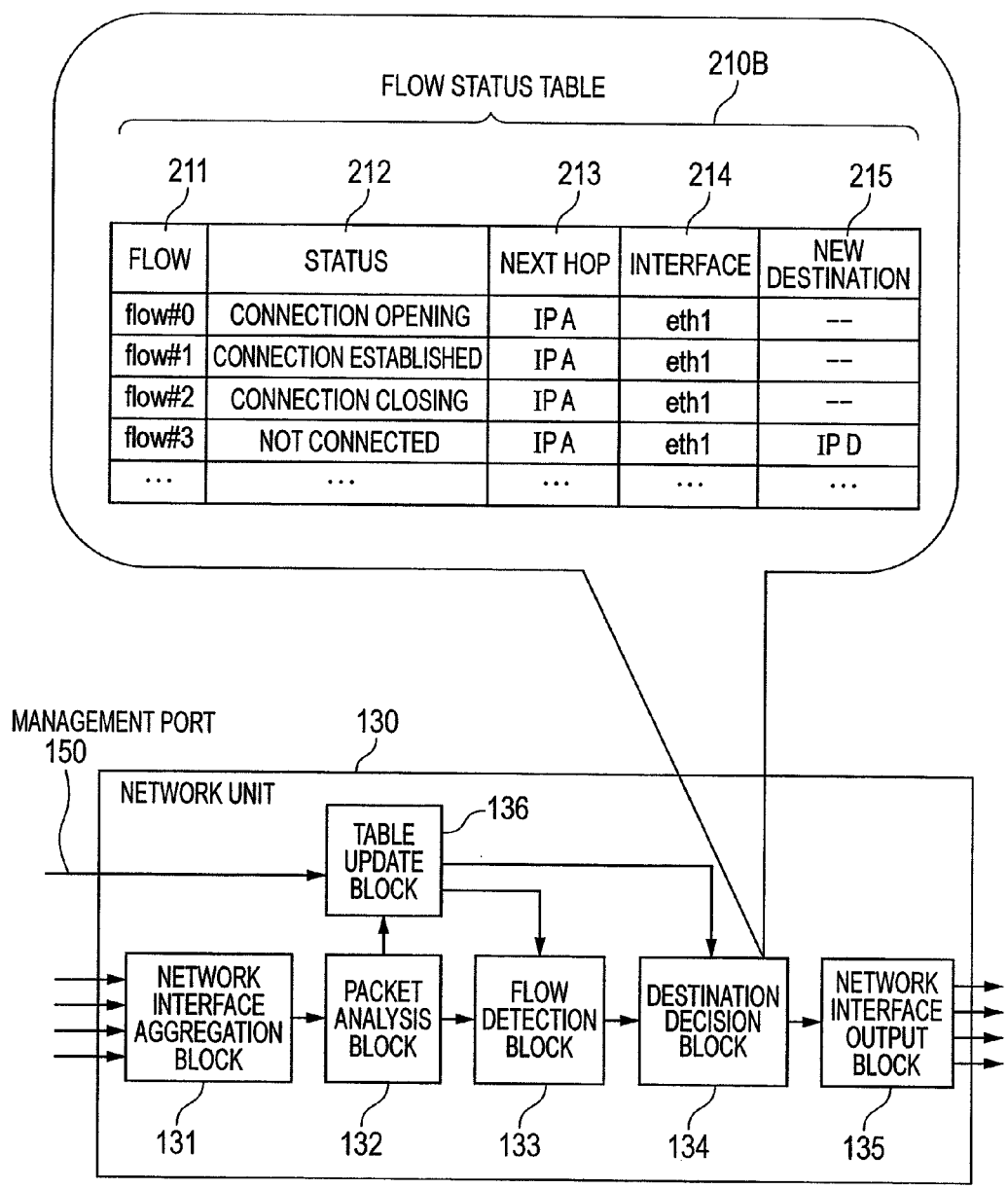
FIG. 5 shows another example of a destination decision block and a flow status table in the first embodiment.

FIG. 5 shows another configuration of the flow status table to be used by the destination decision block 134. In a flow status table 210B shown in FIG. 5, it has a new destination 215 column in addition to the configuration of the flow status table 210 shown in FIG. 4. This new destination address 215 shows, for instance the status 212 is "Not connected" as in flow #3, the IP address (IP D) of the device of a new destination address has been set as the final destination address of the pertinent flow.

Setting of the flow table 200 an example of which is shown in FIG. 3 is accomplished by the management node 400 described earlier. More specifically, information listing a combination of fields defined as a flow, such as a combination of the destination IP address (DIP), the source IP address (SIP), the destination port (DP), and the source port (SP), is notified to each intelligent node (IN) together with flow numbers (flow #). The network unit 130 of the intelligent node 100 having received this information updates the setting of the flow table 200 by using the table update block 136. The priority level of each flow may as well be defined and notified together with the information on the field combination to be notified together with the flow numbers. The flow status table 210 can be prepared with a dedicated hardware circuit or software.

Now, every packet other than those destined for the intelligent node 100 itself is handed over to the flow detection block 133 after undergoing analysis of various items of header information, and of payload information if necessary, within the packet by the packet analysis block 132 to extract elements managed by the flow table 200, and the flow detection block 133 identifies the flow number (flow #) of the pertinent packet. A packet destined for the intelligent node 100 itself is a control packet, and if the content of the control packet is flow updating information, the table update block 136 updates the flow table 200. Or if the content of the control packet is load information to be described afterwards, it is used for updating the flow status table 210.

Initial setting of the flow status table 210 and policy definition for updating of the flow status table 210 are accomplished by the management node 400 as stated above. More specifically, the management node 400 prepares in advance the initial values of the next hop and the interface of the corresponding flow as initial setting. If it is the application first operating on the data center (DC) 300, the next hop shall be the IP address of the communication apparatus which is the next transfer destination for transferring the packet to the data center (DC) 300 and the interface, the physical port of the intelligent node 100 to which this communication apparatus is connected.

The flow status table 210 is prepared with a dedicated hardware circuit or software. For instance, the flow status table 210 is arranged in the destination decision block 134 within the network unit 130 of FIG. 1. If it is to be prepared with software, the table is prepared on the memory referred to above. Incidentally, a usual routing table is also placed in the destination decision block 134. In this embodiment, the destination address of the packet is made alterable by giving priority to routing stated in the flow status table 210 instead of routing according to the routing table as far as flows registered in the flow status table 210 are concerned.

As a modification, the flow status table 210 may as well be disposed in the server 110 of FIG. 1. In this case, in the network unit 130, the destination decision block 134 transfers any packet belonging to the pertinent flow, of which the destination address or the destination may be altered, to the pertinent server 110 by using the process of usual policy-based routing irrespective of a break in the application. The server 110 has a flow status table software-wise and logically, and therefore transfers the packet as stated in the pertinent flow status table. As the server 110 operates on the basis of a software program executed by the CPU, if there is a speed issue, a dedicated hardware circuit can be used in the server 110 part.

Now, where a field of the new destination address 215 in the flow status table 210B shown in FIG. 5 is to be provided, the destination decision block 134 alters the destination IP address of the input packet to the IP address stated in the new destination address 215. In this case, the destination decision block 134 once terminates the communication, and starts communication to the new destination address 215 anew. By the method using the new destination address 215 of the flow status table 210B, communication to the terminal is once terminated, new communication is carried out to the new destination address, and eventually the same effect as communication by the terminal to the new destination address is achieved.

To add, as stated above, a routing table (not shown) is used in combination to determine the destination from the intelligent node (IN) of the packet in this embodiment as well. More specifically, if searching of the flow status tables 210 and 210B reveals absence of registration, the routing table is searched as usual to determine the next hop and interface indicating the destination. On a packaged basis, the flow information table and the routing table may as well be search simultaneously. In this case, if any registration is found in the flow status tables 210 and/or 210B, the destination is determined according to the flow information table.

The flow information table and the routing table are the same in the process of determining the destination from the intelligent node (IN). However, while the routing table determines the destination for the destination IP address according to a routing protocol such as Open Shortest Path First (OSPF) and Border Gateway Protocol (BGP), the flow status table in this embodiment is entirely different in configuration in that it determines the destinations corresponding to multiple fields in a packet according to an instruction by the management node 400 and the load situation of the servers 110. Thus, as the destination is altered according to the status of the flow by using the flow status table in this embodiment, it is made possible to dynamically alter the position of the server to execute the application, namely, the information processing position.

Next, the initial registration in each table in this embodiment and the flow of its rewrite processing will be described with reference to FIG. 7 through FIG. 9.

First, registration in the flow table 200 itself is accomplished by an external management node 400 shown in FIG. 13 and FIG. 14 or a manager as stated earlier. In the former case, as described above, a packet containing flow updating information for updating the flow table 200 is generated by the management node 400, and transmitted to the pertinent intelligent node 100. Specifics of processing within the intelligent node 100 will be described afterwards. In the latter case, an instruction is given to the table update block 136 within the network unit 130 via the management port 150 shown in FIG. 1. Incidentally in the former case, a configuration in which a network for use in communication from the management node 400 is connected to the management port 150 is also conceivable.

Figure 7:
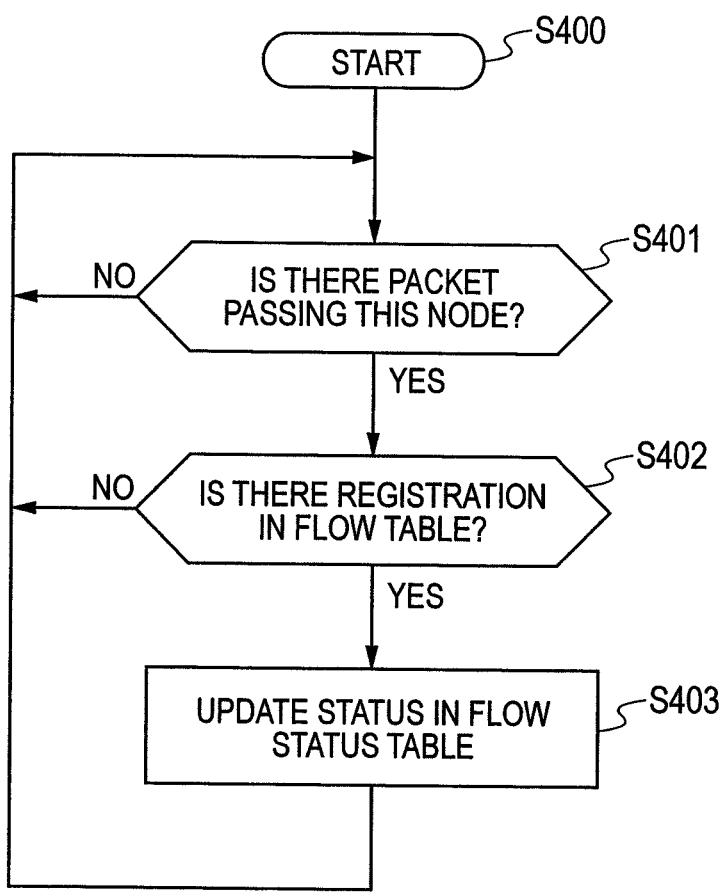
FIG. 7 is a flow chart illustrating formula registration in the flow table and the flow status table in the first embodiment.

FIG. 7 is a flow chart of initial registration into the flow table 200 and the flow status table 210. Referring to the chart, when initial registration into the table update block 136 is started (S400), first it is judged whether or not there is a packet passing this node (S401) and, if there is, it is judged whether or not there is registration in the flow table 200 (S402). If there is registration in the flow table 200, the status 212 of the flow status table 210 is updated.

Figure 8:
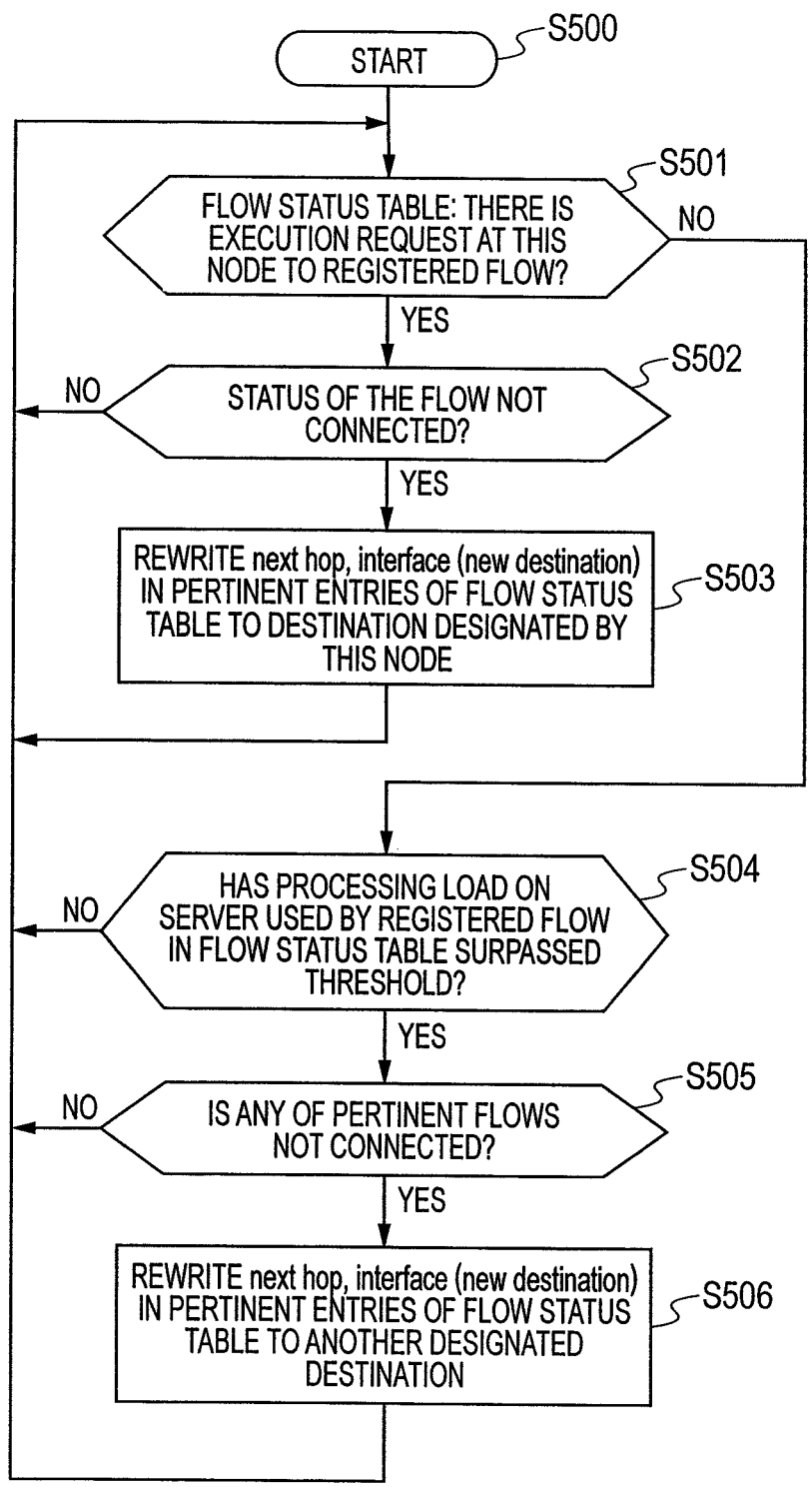
FIG. 8 is a flow chart illustrating rewriting of the flow status table in the first embodiment.

Next, FIG. 8 is a flow chart of rewriting the flow status table. In the table update block 136, when the rewriting flow is started (S500), it is first checked whether or not the flow status table registration flow contains a request for execution by this node server (S501). If there is a request for execution (yes), it is checked whether or not the status 212 of the flow is "Not connected" (S502). If it is judged here that the flow is "Not connected" (yes), the next hop 213, the interface 214, and the new destination address 215 of the pertinent entry in the flow status table 210 are rewritten to the destination address designated by this node.

If there is no request for execution by this node server (no at S501), it is judged, as described earlier by way of example, whether or not the load to be processed by the server used by the flow status table and the registration flow has surpassed the threshold (S504). If it is judged that the threshold has been surpassed (yes), it is judged whether or not there is anything in a not-connected state in the pertinent flow (S505), and if there is (yes), the next hop 213, the interface 214, and the new destination address 215 in the pertinent entry in the flow status table 210 are rewritten to match another designated destination (S506). After steps S503 and S506 are completed or if the judgment is negative (no) at steps S502, S504, and S505, the processing returns to step S501.

Figure 9:
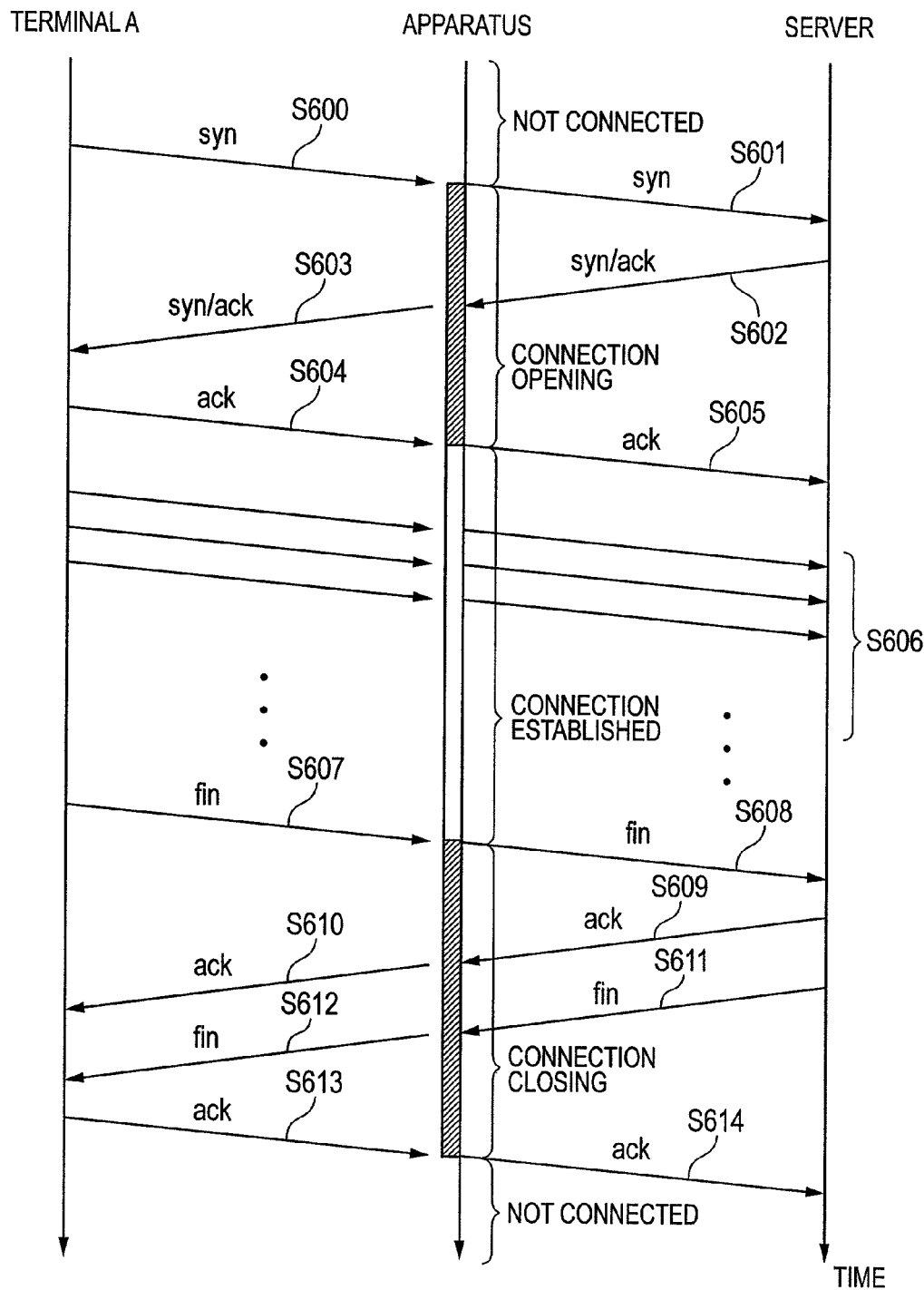
FIG. 9 shows signals relationships for status transitions in the flow status table in the first embodiment.

FIG. 9 shows one example of signal relationship for status transition of the flow status table 210 in an exemplary case of Transmission Control Protocol (TCP) connection. In this figure, terminal A represents one of the terminals 340 in FIG. 13 or FIG. 14; this apparatus means the intelligent node (IN) of this embodiment, and the server means either a server in the data center (DC) 300 to be described afterwards or a server in another intelligent node (IN) on the network.

As is obvious from this drawing, when a synchronization (syn) packet is transmitted from terminal A (S600) in a not-connected state as in usual TCP connection, the synchronization (syn) packet is transmitted from this apparatus, which is an intelligent node (IN), to a prescribed server (S601), and a transition to the connection opening state takes plate at step S602 through S605. When in a connection-established state, an information packet containing data and the like is transmitted from the terminal A to an server via this apparatus (S606). After the end of transmission, connection closing is accomplished at steps S607 through S614, and after the completion of, this processing, the not-connected state is resumed. Obviously, these connection opening, connection established, connection closing and not-connected states correspond to the respectively matching statuses in FIG. 4 and FIG. 5.

Figure 10:
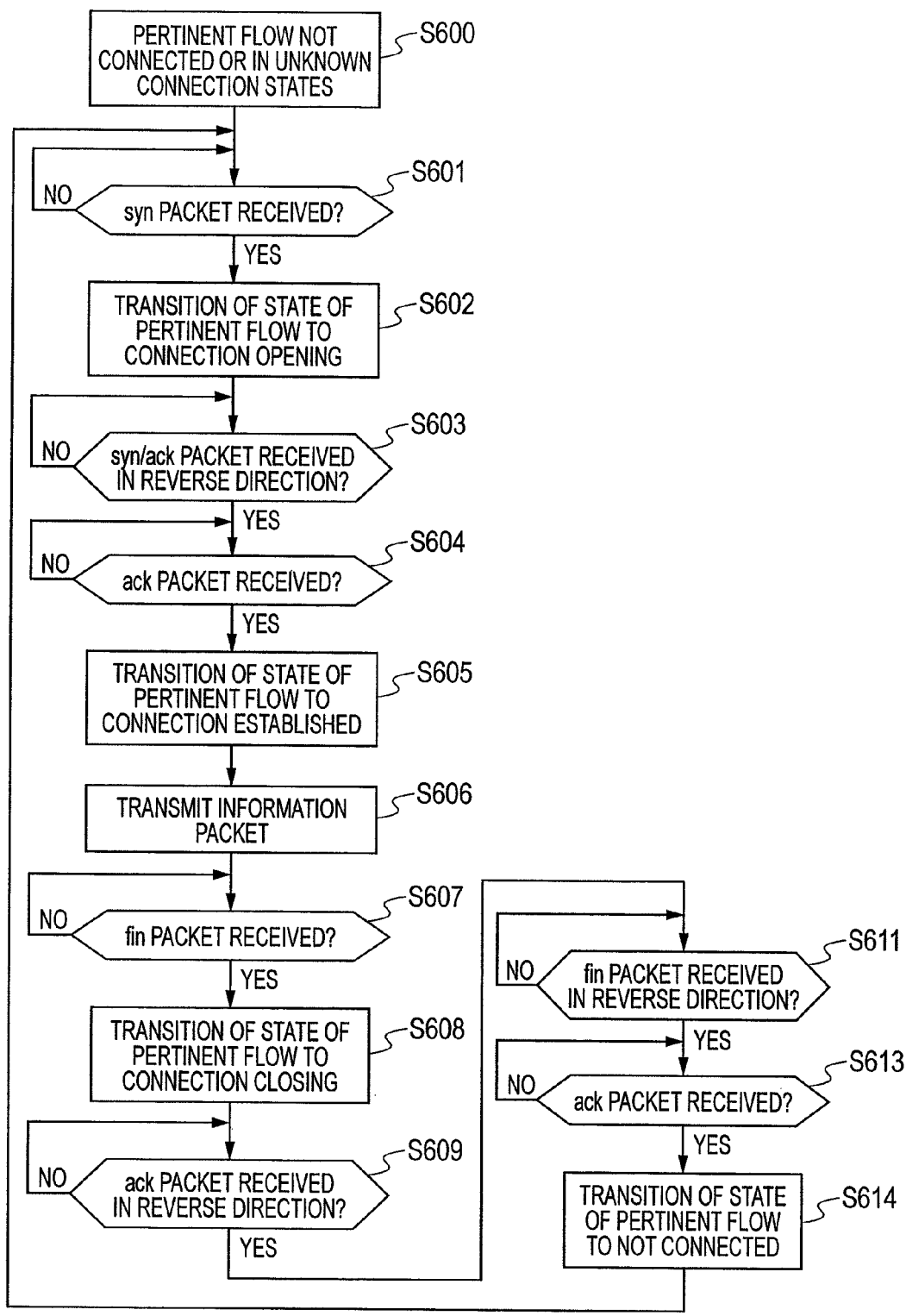
FIG. 10 is a flow chart illustrating status transitions in the flow status table in the first embodiment.

FIG. 10 is a flow chart of status transition when the prescribed flow is not connected or unknown in connection status. The intelligent node 100, which is this apparatus in FIG. 9, receives a synchronization (syn) packet (S601) and, via steps S602 through S604, the flow undergoes transition to the connection established status (S605). After that, as was described with reference to FIG. 9, the information packet is transmitted in the connection established state (S606), followed by processing of connection closing via steps S607 through S613, and transition to the not connected state takes place (S614).

Now, the management node 400 in this embodiment, if it judges that an application belonging to a certain flow should more preferably be executed on a prescribed intelligent node (IN), issues an executing instruction to the intelligent node (IN). A control packet in which this executing instruction is stated reaches the table update block 136 of the pertinent intelligent node (IN), and undergoes transition from the status of S501 to that of S502 in the flow chart of FIG. 8 referred to above.

Here, as the initial value of the status field 212 in the flow status table 210 varies with timing, it is unknown at the beginning. If it is unknown, the status transition itself of the pertinent flow is as shown in the flow chart of FIG. 10, but as the judgment at step S502 in FIG. 8 does not deem it to be not connected, no transition to the status of step S503 is possible. However, by continuing to observe the flow, transition from the unknown status to the connection opening status (S601 to S602) can be achieved, and continuation of this transition will result in transition to the not connected state without fail. After this transition to the not connected state, transition from the status of S502 to that of S503 in the flow chart of FIG. 8 takes place to alter the destination address information in the flow status table 210, and altering the destination of packet transfer from the data center (DC) to the server 110 in the intelligent node 100 in accordance with an instruction from the management node 400 and the like enables the position of information processing to be altered.

As stated above, the management node 400 also notifies policy definition for updating the flow status table 210 to the table update block 136 of the intelligent node 100 by way of a control packet. As an example of policy definition, a flow with high priority continues to be allocated to the same server 110 within the intelligent node 100 whenever practicable; a flow with medium priority is reallocated to another server 110, different from that for the flow with high priority, within the intelligent node 100, and a flow with low priority is reallocated to another intelligent node (IN) or the data center (DC). Under this policy, the thresholds of the processing loads on servers observed in the S504 status in the flow chart of FIG. 8 are classified by the level of priority: this policy can be implemented by, for instance, prescribing a high threshold for high priority flows and a low threshold for low priority flows.

To add, when the information processing section is to be allocated to another intelligent node (IN), there is a method by which the packet is capsulated in the pertinent intelligent node 100 with an L3 header containing an IP address of another intelligent node (IN) of the IP address itself is rewritten. By another modification, in expectation of another intelligent node 100 on the route to the data center (DC), the packet is outputted as it is from the outlet interface communicating with the data center (DC).

Further in this embodiment, if so designated by the management node 400, the intelligent node 100 regularly notifies information integrating the load information on each of its servers 110 to the network units 130 of other intelligent nodes 100. Since if all the intelligent nodes so notify one another the overhead may become too large or implementation at the original data center (DC) would involve a smaller delay, this mutual notification is done among the intelligent nodes (IN) that may carry out information processing for the pertinent user. Or, if practicable, the management node 400 may consolidate load information of the data center (DC) and notifies the consolidated information to the intelligent nodes (IN).

Now, with a view to facilitation of understanding of the address altering ,process (module) of this embodiment, one example of transition of the flow status table will be described with reference to specific cases shown in FIG. 16 through FIG. 19. In this example, the next hop and interface of an not connected flow are rewritten.

Figure 16:
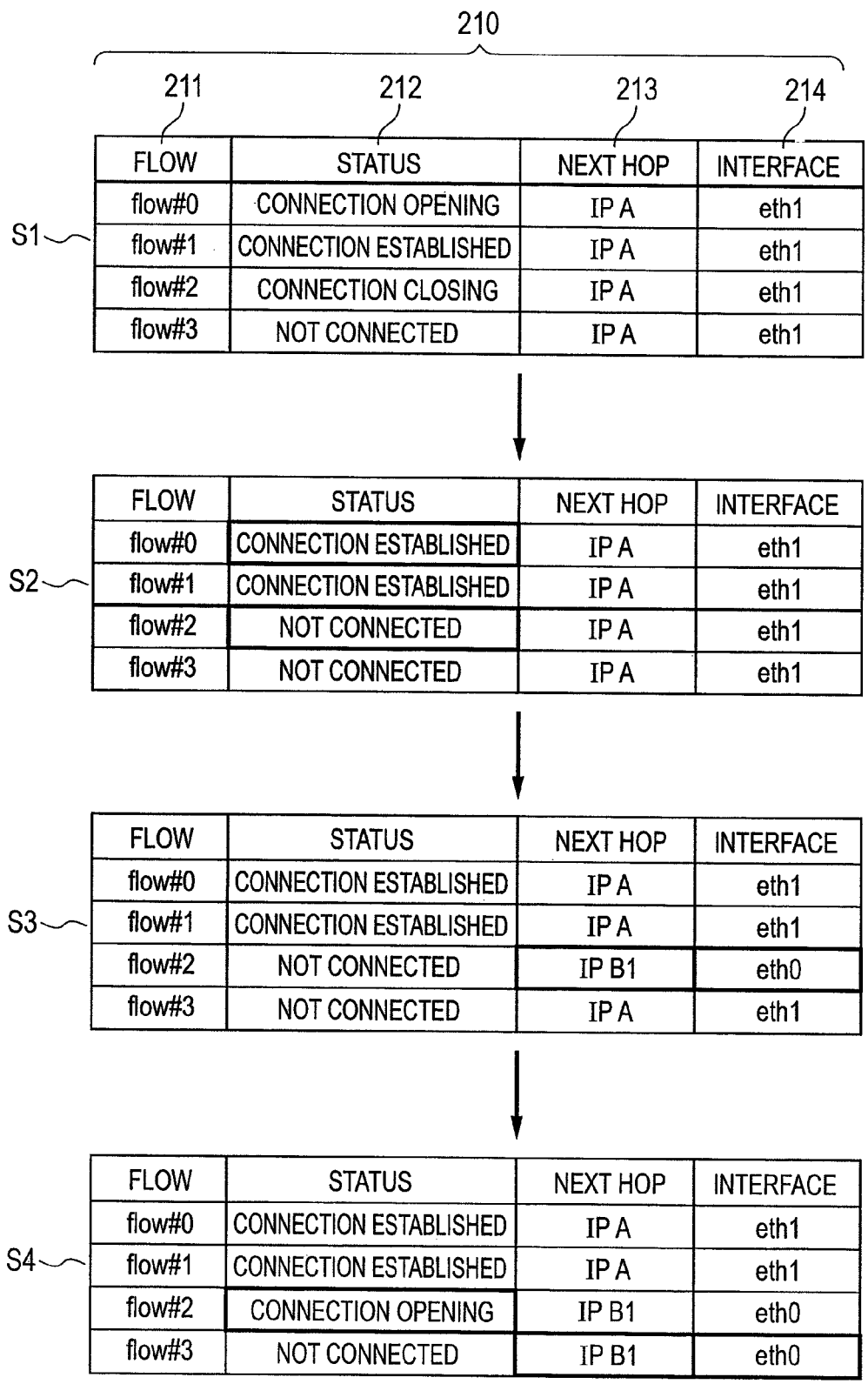
FIG. 16 shows transition example (1) of a flow status table in the first embodiment.

Referring to FIG. 16, every flow is destined outside the node in the flow status table 210 in its initial state S1. Thus, for all the flows (flow #0 through flow #3), the next hop) 213 and the interface 214 are set to an IP address of IP A and a MAC address of eth1, respectively. In the next state S2, it is detected that flow #0 is connection-established and flow #2 has become not connected. Then in state S3, the next destination address of the not connected flow #2 is altered to the own node server 110-1 having an IP, address of IP B1, and the output interface to an MAC address of eth0 to which the server 110-1 is to be connected. After that, in state S4, flow #2 goes into a status of Connection opening, and the destination address is altered to the server 110-1 having an IP address of B1. Also, the next destination address of flow #3 is altered to the own node server 110-1 having an IP address of B1, and the output interface to an MAC address of eth0.

Figure 17:
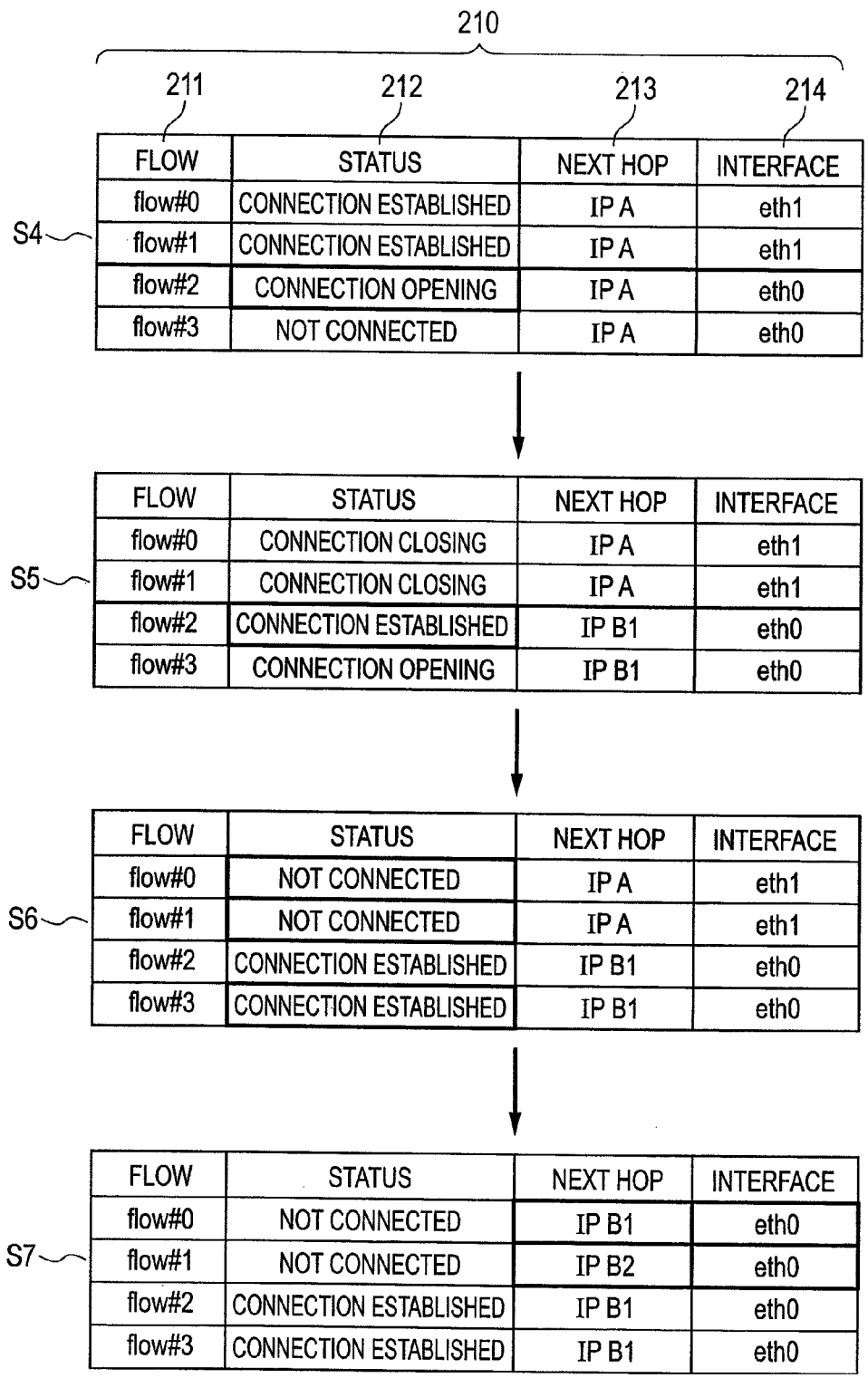
FIG. 17 shows transition example (2) of a flow status table in the first embodiment.

Referring now to FIG. 17, in state S5 following state S4, flow #2 becomes connection-established, transition of flow #0 and flow #1 to a state of connection closing takes place, and transition of flow #3 to a state of Connection opening takes place. Similarly in state S6, transition of flow #0 and flow #1 to a not-connected state takes place, and transition of flow #3 to a connection-established state takes place. Further in state S7, the next destination addresses of flow #0 and flow #1 in a not-connected state are altered to the own node servers 110-1 and 110-2 having IP addresses of IP B1 and IP B2, and the output interface to a MAC address of eth0.

Figure 18:
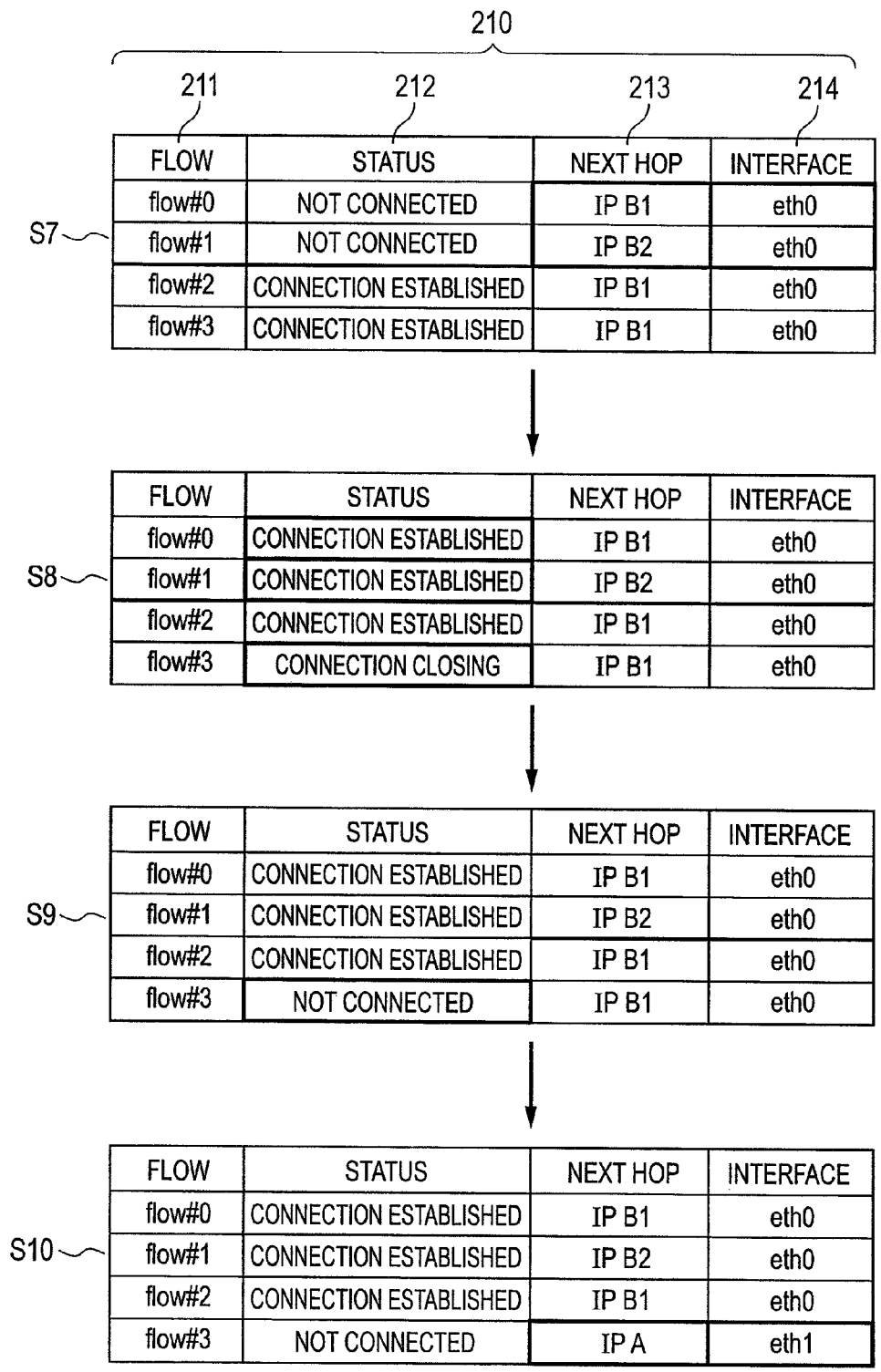
FIG. 18 shows transition example (3) of a flow status table in the first embodiment.

Referring to FIG. 18, in state S8 following state S7, transition of flow #0 and flow #1 to a connection-established state takes place, and flow #3 turns into a state of connection closing. Then in state S9, when transition of flow #3 to an not-connected state takes place, it is judged in state S10 that the processing load on the pertinent node has become too heavy, and the next destination address of flow #3 in a not-connected state is selected as the next unit to be connected to the pertinent node having an IP address of IP A, and the output interface is altered to one having an MAC address of eth1.

Figure 19:
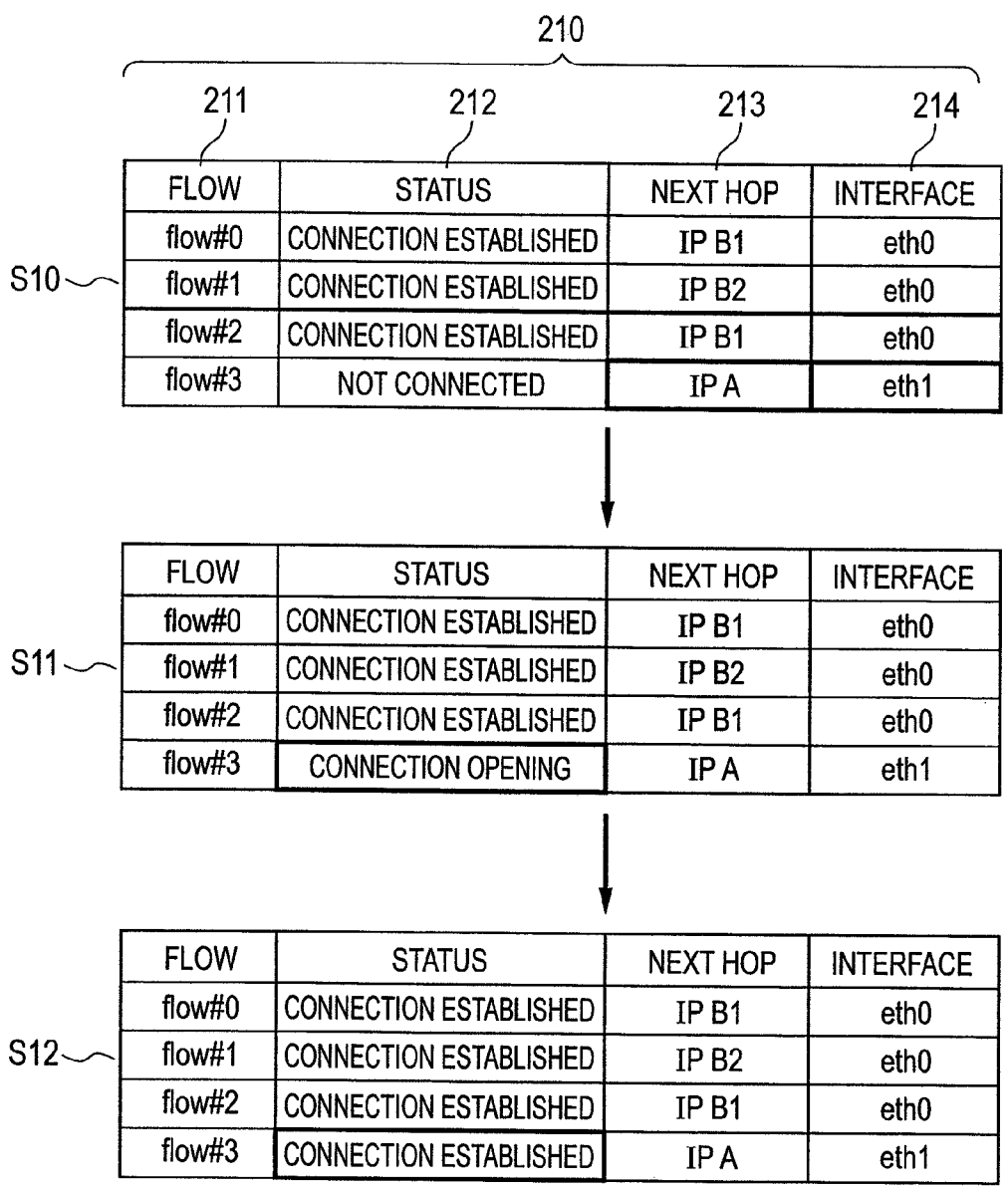
FIG. 19 shows transition example (4) of a flow status table in the first embodiment.

Referring to FIG. 19, in state S11 following state S10, transition of flow #3 to a state of connection opening outside its own node is detected. After that, flow #3 is forbidden from altering its next hop 213 and interface 214 until it becomes not-connected. Finally in state S12, transition of flow #3 becomes connection-established outside its own node.

The configuration of the first embodiment of the invention described above enables processing by a distant data center to be executed by a network node near the terminal, needing that processing. Usually, this address altering process reduces a processing delay Z (the sum of a delay A due to the communication distance and a delay B due to the time taken to execute the application) as viewed from the terminal. However, when the load on the module of information processing by the server of the network node increases, the delay B due to the time taken to execute the application is extended, which may eventually make the processing delay Z as viewed from the terminal longer than was initially intended. It is possible to address such a case by having the intelligent node (IN) report the current state to the management node and wait for a new instruction from the management node to alter the destination address. Or it is also possible to have a destination address alteration policy from the management node in advance and, when a situation to which the policy is applicable (here a situation in which the delay proves longer than was initially intended), to let each intelligent node alter the destination address autonomously.

The new destination address, if it involves rewriting of only the next hop and the interface, is transferred to the next unit to be directly connected to its own intelligent node (in many cases a communication apparatus) and the usual routing is followed thereafter. In this routing, if there is another intelligent node on the route to the data center and the flow status table at that intelligent node has the same entries, the packet will be captured into that intelligent node and the application executed therein. If there is no intelligent node on the route, the packet will arrive at the data center, and be processed at the data center as initially planned. Or if the next destination address is altered, the final destination address can be expressly altered. Namely, either a next nearby intelligent node may be expressly designated or the final data center may be designated.

According to the present invention hitherto described in detail, application processing which would be executed at a distant data center can be executed at a network node close to the terminal, and the processing delay as viewed from the terminal can be reduced. Also, the quantity of data flowing in the network can be restrained, resulting in electric power saving for the whole system.

Industrial Applicability

The invention is significantly useful as fused technology of information processing and communication that permits solution of various issues of delay time, reliability and energy efficiency in datacenter-consolidated information systems.

What is claimed is:

1. An information system where an information processing apparatus and terminals requesting processing of information on the information processing apparatus are arranged in a network, the information system comprising:
 a plurality of intelligent nodes that are arranged in boundary positions or gateway positions of the network, and
 a management node, connected to the network, that manages a plurality of the intelligent nodes,
 wherein each of the intelligent nodes includes:
  an information processing section that executes information processing;
  a network unit including an address altering section; and
  a plurality of interfaces;
 wherein each network unit comprises:
  an aggregation block for aggregating received packets,
  a flow detection block for identifying a group of the received packets having same header information as a flow in accordance with a rule set forth with regard to the packets,
  a destination decision block including a table which holds, for each flow, a connection status, address information for identifying an information processing section of a respective intelligent node or the information processing apparatus and an interface;
  a table update block for updating the table; and
  an output block for outputting the received packets related to an identified flow in accordance with the table,
 wherein the management node is configured to perform steps of:
  generating a first request for copying, to the information processing section of a selected intelligent node, an application to enable the selected intelligent node to process a flow of information in place of the information processing apparatus,
  generating a second request for rewriting the table of the selected intelligent node for recording a destination to specify the information processing section of the selected intelligent node as the destination of a flow related to said processing, and
  transmitting the first request and the second request to the selected intelligent node,
 wherein the selected intelligent node is configured to perform a step of:
  copying to an information processing section an application to enable the selected intelligent node to process the flow of information based on the first request,
 wherein the table update block is configured to perform a step of:
  rewriting the address information in the table of the selected intelligent node and the interface in the table when the connection status in the table of the flow designated by the second request in the table is "not connected", the rewritten address information and the rewritten interface are related to a flow designated by the second request,
 wherein the output block is configured to perform a step of:
  outputting the received packets related to the identified flow in accordance with the rewritten table including the rewritten address information and the rewritten interface.

2. The information system according to claim 1, further comprising a first table update block of a first intelligent node of the plurality of intelligent nodes, wherein the first intelligent node is configured to perform steps of:
 checking whether or not the second request transmitted from the management node contains a request for execution by a first information processing section of the first intelligent node,
 in case that the second request contains the request for execution by the first information processing section, when the connection status of the flow designed by the second request in the table is "not connected",
 rewriting the address information of the table to another address information for identifying the first information processing section in connection with the flow designated by the second request,
 rewriting the interface in the table to another interface for identifying a first interface connecting to the first information processing section in connection with the flow designated by the second request,
 in case that the second request does not contain the request for execution by the first information processing section, when the connection status of the flow designated by the second request in the table is "not connected",
 rewriting the address information of the table to another address information for identifying one of the information processing sections except the first information processing in connection with the flow designated by the second request, and rewriting the interface in the table to another interface for identifying one of the interfaces connecting to the information processing sections except the first information processing in connection with the flow designated by the second request.

3. The information system according to claim 1, wherein the table update block of the selected intelligent node is configured to perform steps of:
receiving load information associated with the information processing section of the selected intelligent node,
in case that the load information surpasses a threshold, rewriting the address information and the interface which are associated with the information processing section to another address information and another interface which are associated with another information processing section whose load does not surpass the threshold.

4. The information system according to claim 1, wherein the rule is included in a first table in which a plurality of the received packets are recognized in accordance with designated stored conditions as a same flow are stored; and
the table is a second table for recording the connection state, the address information and the interface,
wherein the address information and the interface are for determining the designation of each of the flows.

5. The information system according to claim 4, wherein the second table further records the final destination address of each of the flows.

6. The information system according to claim 1, wherein the information processing section of the selected intelligent node downloads an application to be executed by the information processing apparatus via the network and executes the downloaded application.

7. The information system according to claim 1, wherein the network unit further comprising:
a packet analysis block for judging the destination of a received packet, whether the destination is an own intelligent node or any other,
in case that the destination of the packet is the own intelligent node, the packet analysis block transfers the received packet to the table update block of the selected intelligent node.

8. An intelligent node configured to be connected to an information processing apparatus and a management node via a network, comprising:
an information processing section that executes information processing;
a network unit including an address altering section; and
a plurality of interfaces
wherein each network unit comprises:
an aggregation block for aggregating received packets,
a flow detection block for identifying a group of the received packets having same header information as a flow in accordance with a rule set forth with regard to the packets,
a destination decision block including a table which holds, for each flow, a connection status, address information for identifying an information processing section of a respective intelligent node, or the information processing apparatus and an interface;
a table update block for updating the table; and
an output block for outputting the received packets related to an identified flow in accordance with the table,
wherein the management node is configured to perform steps of:
generating a first request for copying, to the information processing section of a selected intelligent node, an application to enable the selected intelligent node to process a flow of information in place of the information processing apparatus,
generating a second request for rewriting the table of the selected intelligent node for recording a destination to specify the information processing section of the selected intelligent node as the destination of a flow related to said processing, and
transmitting the first request and the second request to the selected intelligent node,
wherein the selected intelligent node is configured to perform a step of:
copying to an information processing section an application to enable the selected intelligent node to process the flow of information based on the first request,
wherein the table update block is configured to perform a step of:
rewriting the address information in the table of the selected intelligent node and the interface in the table when the connection status in the table of the flow designated by the second request in the table is "not connected", the rewritten address information and the rewritten interface are related to a flow designated by the second request,
wherein the output block is configured to perform a step of:
outputting the received packets related to the identified flow in accordance with the rewritten table including the rewritten address information and the rewritten interface.

9. The intelligent node according to claim 8, further comprising a first table update block of the intelligent node, wherein the intelligent node is configured to perform steps of:
checking whether or not the second request transmitted from the management node contains a request for execution by a first information processing section of the intelligent node,
in case that the second request contains the request for execution by the first information processing section, when the connection status of the flow designed by the second request in the table is "not connected",
rewriting the address information of the table to another address information for identifying the first information processing section in connection with the flow designated by the second request,
rewriting the interface of the table to another interface for identifying a first interface connecting to the first information processing section in connection with the flow designated by the second request,
in case that the second request does not contain the request for execution by the first information processing section, when the connection status of the flow designated by the second request in the table is "not connected",
rewriting the address information of the table to another address information for identifying one of the information processing sections except the first information processing section in connection with the flow designated by the second request, and
rewriting the interface of the table to another interface for identifying one of the interfaces connecting to the information processing sections except the first information processing section in connection with the flow designated by the second request.

10. The intelligent node according to claim 8,
wherein the table update block of the selected intelligent node is configured to perform steps of:
receiving load information associated with the information processing section of the selected intelligent node,
in case that the load information surpasses a threshold, rewriting the address information and the interface which are associated with the information processing section to another address information and another interface which are associated with another information processing section whose load does not surpass the threshold.

11. The intelligent node according to claim 8,
wherein the rule is included in a first table in which a plurality of the received packets are recognized in accordance with designated stored conditions as a same flow are stored; and
the table is a second table for recording the connection state, the address information and the interface,
wherein the address information and the interface are for determining the designation of each of the flows.

12. The intelligent node according to claim 11, wherein the second table further records the final destination address of each of the flows.

13. The intelligent node according to claim 8, wherein the information processing section of the selected intelligent node downloads an application to be executed by the information processing apparatus via the network and executes the downloaded application.

14. The intelligent node according to claim 8, wherein the network unit further comprising:
- a packet analysis block for judging the destination of a received packet, whether the destination is an own intelligent node or any other,
- in case that the destination of the packet is the own intelligent node, the packet analysis block transfers the received packet to the table update block of the selected intelligent node.

15. A method of altering destination addresses in intelligent nodes of an information system where an information processing apparatus and terminals requesting processing of information on the information processing apparatus are arranged in a network, wherein the information system comprises a plurality of the intelligent nodes that are arranged in boundary positions or gateway positions of the network, and a management node, connected to the network, that manages a plurality of the intelligent nodes,
  wherein each of the intelligent nodes includes:
    an information processing section that executes information processing;
    a network unit including an address altering section; and
    a plurality of interfaces;
  wherein each network unit comprises:
    an aggregation block for aggregating received packets,
    a flow detection block for identifying a group of the received packets having same header information as a flow in accordance with a rule set forth with regard to the packets,
    a destination decision block including a table which holds, for each flow, a connection status, address information for identifying an information processing section of the respective intelligent node or the information processing apparatus and an interface;
    a table update block for updating the table; and
    an output block for outputting the received packets related to an identified flow in accordance with the table,
  wherein the method comprises management node performing steps of:
    generating a first request for copying to the information processing section of a selected node, an application to enable the selected intelligent node to process a flow of information in place of the information processing apparatus,
    generating a second request for rewriting the table of the selected intelligent node for recording a destination to specify the information processing section of the selected intelligent node as the destination of a flow related to said processing, and
    transmitting the first request and the second request to the selected intelligent node,
  wherein the method further comprises each intelligent node performing a step of:
    copying to an information processing section an application to enable the selected intelligent node to process the flow of information based on the first request,
  wherein the method further comprises to table update block performing a step of:
    rewriting the address information in the table of the selected intelligent node and the interface in the table when the connection status in the table of the flow designated by the second request in the table is "not connected", the rewritten address information and the rewritten interface are related to a flow designated by the second request,
  wherein the method further comprises the output block performing a step of:
    outputting the received packets related to the identified flow in accordance with the rewritten table including the rewritten address information and the rewritten interface.

16. The method according to claim 15, further comprising a first table update block of a first intelligent node of the plurality of intelligent nodes, performing steps of:
  checking whether or not the second request transmitted from the management node contains a request for execution by a first information processing section of the first intelligent node,
  in case that the second request contains the request for execution by the first information processing section, when the connection status of the flow designed by the second request in the table is "not connected",
  rewriting the address information of the table to another address information for identifying the first information processing section in connection with the flow designated by the second request,
  rewriting the interface in the table to another interface for identifying a first interface connecting to the first information processing section in connection with the flow designated by the second request,
  in case that the second request does not contain the request for execution by the first information processing section, when the connection status of the flow designated by the second request in the table is "not connected",
  rewriting the address information of the table to another address information for identifying one of the information processing sections except the first information processing section in connection with the flow designated by the second request, and
  rewriting the interface in the table to another interface for identifying one of the interfaces connecting to the information processing sections except the first information processing section in connection with the flow designated by the second request.

17. The method according to claim 15,
wherein the table update block of the selected intelligent node performs steps of:
receiving load information associated with the information processing section of the selected intelligent node,
in case that the load information surpasses a threshold, rewriting the address information and the interface which are associated with the information processing section to another address information and another interface which are associated with another information processing section whose load does not surpass the threshold.

18. The method according to claim 15,
wherein the rule is included in a first table in which a plurality of the received packets are recognized in accordance with designated stored conditions as a same flow are stored; and
the table is a second table for recording the connection state, the address information and the interface, wherein the address information and the interface are for determining the designation of each of the flows.

19. The method according to claim 18, wherein the second table further records the final destination address of each of the flows.

20. The method according to claim 15, wherein the information processing section of the selected intelligent node downloads an application to be executed by the information processing apparatus via the network and executes the downloaded application.

21. The method according to claim 15, wherein the network unit further comprising:
judging, via a packet analysis block, the destination of a received packet, whether the destination is an own intelligent node or any other,
in case that the destination of the packet is the own intelligent node, transferring, via the packet analysis block, the received packet to the table update block of the selected intelligent node.

* * * * *